(12) United States Patent
Yang et al.

(10) Patent No.: US 11,386,693 B2
(45) Date of Patent: Jul. 12, 2022

(54) DISPLAY DEVICE

(71) Applicant: Samsung Display Co., LTD., Yongin-si (KR)

(72) Inventors: Dong Wook Yang, Suwon-si (KR);
Hyun Dae Lee, Hwaseong-si (KR);
Seung Hyun Moon, Suwon-si (KR);
Young Eun Lee, Hwaseong-si (KR);
Hee Chui Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/930,321

(22) Filed: Jul. 16, 2020

(65) Prior Publication Data
US 2021/0117639 A1    Apr. 22, 2021

(30) Foreign Application Priority Data

Oct. 22, 2019   (KR) ........................ 10-2019-0131237

(51) Int. Cl.
*G06K 9/00* (2022.01)
*G06V 40/13* (2022.01)

(52) U.S. Cl.
CPC ................................ *G06V 40/1318* (2022.01)

(58) Field of Classification Search
CPC ............. G06K 9/0004; G06K 9/00006; G06K 9/00013; G06K 9/00026
See application file for complete search history.

(56) References Cited

U.S. PATENT DOCUMENTS

| | | | |
|---|---|---|---|
| 10,599,939 B2 | 3/2020 | Gu et al. | |
| 2008/0224913 A1* | 9/2008 | Suzuki | H03M 1/1023 341/155 |
| 2011/0044513 A1 | 2/2011 | McGonagle et al. | |
| 2018/0012069 A1* | 1/2018 | Chung | G06K 9/2036 |
| 2018/0365470 A1* | 12/2018 | Li | G06T 5/50 |
| 2020/0026898 A1* | 1/2020 | Fan | H04N 5/2253 |
| 2020/0050828 A1* | 2/2020 | Li | G06T 5/002 |

FOREIGN PATENT DOCUMENTS

| | | |
|---|---|---|
| CN | 109241859 | 1/2019 |
| EP | 3267359 | 1/2018 |
| KR | 20120037495 | 4/2012 |
| KR | 20170106425 | 9/2017 |
| KR | 20180005588 | 1/2018 |
| WO | 2017067264 | 4/2017 |
| WO | 2018214481 | 11/2018 |

OTHER PUBLICATIONS

Extended European Search Report dated Mar. 19, 2021,issued to European Patent Application No. 20202639.9.

* cited by examiner

*Primary Examiner* — Lixi C Simpson

(74) *Attorney, Agent, or Firm* — H.C. Park & Associates, PLC

(57) ABSTRACT

The display device comprises: a display panel displaying an image, a light blocking layer disposed under the display panel and comprising a plurality of holes, a fingerprint sensing layer disposed under the light blocking layer and comprising a plurality of fingerprint sensors receiving reflected light passing through the plurality of hole and generating a sensing signal, and a sensor driver controlling operations of the plurality of fingerprint sensors. The sensor driver compares fingerprint data generated based on a sensing signal generated from reflected light by a user's fingerprint with prestored reference data to generate a fingerprint image.

16 Claims, 22 Drawing Sheets

FPD, REFD

| | | | | SMR | | | | | | | |
|---|---|---|---|---|---|---|---|---|---|---|---|
| A11 | A12 | A13 | A14 | SM11 | SM12 | SM13 | SM14 | B15 | B16 | B17 | B18 |
| A21 | A22 | A23 | A24 | SM21 | SM22 | SM23 | SM24 | B25 | B26 | B27 | B28 |
| A31 | A32 | CM11 | CM12 | CM13 | CM14 | CM15 | CM16 | CM17 | CM18 | B37 | B38 |
| A41 | A42 | CM21 | CM22 | CM23 | CM24 | CM25 | CM26 | CM27 | CM28 | B47 | B48 |
| SM31 | SM32 | CM31 | CM32 | CM33 | CM34 | CM35 | CM36 | CM37 | CM38 | SM33 | SM34 |
| SM41 | SM42 | CM41 | CM42 | CM43 | CM44 | CM45 | CM46 | CM47 | CM48 | SM43 | SM44 |
| SM51 | SM52 | CM51 | CM52 | CM53 | CM54 | CM55 | CM56 | CM57 | CM58 | SM53 | SM54 |
| SM61 | SM62 | CM61 | CM62 | CM63 | CM64 | CM65 | CM66 | CM67 | CM68 | SM63 | SM64 |
| C51 | C52 | CM71 | CM72 | CM73 | CM74 | CM75 | CM76 | CM77 | CM78 | D57 | D58 |
| C61 | C62 | CM81 | CM82 | CM83 | CM84 | CM85 | CM86 | CM87 | CM88 | D67 | D68 |
| C71 | C72 | C73 | C74 | SM71 | SM72 | SM73 | SM74 | D75 | D76 | D77 | D78 |
| C81 | C82 | C83 | C84 | SM81 | SM82 | SM83 | SM84 | D85 | D86 | D87 | D88 |

CMR, SMR (left), SMR (right), SMR (bottom)

|   |   |   |   |   |   |   |   |   |   |   |   |
|---|---|---|---|---|---|---|---|---|---|---|---|
| A11 | A12 | A13 | A14 | SM11 | SM12 | SM13 | SM14 | B15 | B16 | B17 | B18 |
| A21 | A22 | A23 | A24 | SM21 | SM22 | SM23 | SM24 | B25 | B26 | B27 | B28 |
| A31 | A32 | CM11 | CM12 | CM13 | CM14 | CM15 | CM16 | CM17 | CM18 | B37 | B38 |
| A41 | A42 | CM21 | CM22 | CM23 | CM24 | CM25 | CM26 | CM27 | CM28 | B47 | B48 |
| SM31 | SM32 | CM31 | CM32 | CM33 | CM34 | CM35 | CM36 | CM37 | CM38 | SM33 | SM34 |
| SM41 | SM42 | CM41 | CM42 | CM43 | CM44 | CM45 | CM46 | CM47 | CM48 | SM43 | SM44 |
| SM51 | SM52 | CM51 | CM52 | CM53 | CM54 | CM55 | CM56 | CM57 | CM58 | SM53 | SM54 |
| SM61 | SM62 | CM61 | CM62 | CM63 | CM64 | CM65 | CM66 | CM67 | CM68 | SM63 | SM64 |
| C51 | C52 | CM71 | CM72 | CM73 | CM74 | CM75 | CM76 | CM77 | CM78 | D57 | D58 |
| C61 | C62 | CM81 | CM82 | CM83 | CM84 | CM85 | CM86 | CM87 | CM88 | D67 | D68 |
| C71 | C72 | C73 | C74 | SM71 | SM72 | SM73 | SM74 | D75 | D76 | D77 | D78 |
| C81 | C82 | C83 | C84 | SM81 | SM82 | SM83 | SM84 | D85 | D86 | D87 | D88 |

FPD, REFD

CMR, SMR

DISPLAY DEVICE

CROSS REFERENCE TO RELATED APPLICATION

This application claims priority from and the benefit of Korean Patent Application No. 10-2019-0131237, filed on Oct. 22, 2019, which is hereby incorporated by reference for all purposes as if fully set forth herein.

BACKGROUND

Field

Exemplary embodiment of the present inventive concept generally related to a display device, especially to d display device with finger print sensor and touch screen.

Discussion of the Background

With the development of information society, requirements for display devices for displaying images have increased in various forms. For example, display devices are applied to various electronic appliances such as smart phones, digital cameras, notebook computers, navigators, and smart televisions. The display device may be a flat panel display device such as a liquid crystal display device, a field emission display device, or an organic light emitting display device.

The organic light emitting display device displays an image using an organic light emitting diode (OLED) that generates light by recombination of electrons and holes. The organic light emitting display device has advantages that it has a fast response speed, has high luminance and a wide view angle, and is driven at low power consumption.

Recently, research and development have been conducted on a technology for integrating a sensor for fingerprint recognition with a display panel occupying the largest area in a display device.

The above information disclosed in this Background section is only for understanding of the background of the inventive concepts, and, therefore, it may contain information that does not constitute prior art.

SUMMARY

Aspects of the present invention are to provide a display device that is capable of acquiring a high-quality fingerprint image using a low-resolution fingerprint sensor.

However, aspects of the present invention are not restricted to the one set forth herein. The above and other aspects of the present invention will become more apparent to one of ordinary skill in the art to which the present invention pertains by referencing the detailed description of the present invention given below.

Additional features of the inventive concepts will be set forth in the description which follows, and in part will be apparent from the description, or may be learned by practice of the inventive concepts.

According to an embodiment of the present disclosure, a display device comprises: a display panel displaying an image, a light blocking layer disposed under the display panel and comprising a plurality of holes, a fingerprint sensing layer disposed under the light blocking layer and comprising a plurality of fingerprint sensors receiving reflected light passing through the plurality of hole and generating a sensing signal, and a sensor driver controlling operations of the plurality of fingerprint sensors. The sensor driver compares fingerprint data generated based on a sensing signal generated from reflected light by a user's fingerprint with prestored reference data to generate a fingerprint image.

The sensor driver may receive a sensing signal corresponding to the user's fingerprint, and may merge data of sensing areas comprising the plurality of fingerprint sensors corresponding to each of the plurality of holes to generate the fingerprint data.

The sensor driver may receive a sensing signal generated from reflected light by a reference member, and may merge data of sensing areas comprising the plurality of fingerprint sensors corresponding to each of the plurality of holes to generate the reference data.

Each of the sensing areas comprises: a central area in which information about the user's fingerprint is concentrated, and a peripheral area surrounding the central area.

The sensor driver may receive a sensing signal corresponding to the user's fingerprint, and may merge data of the peripheral area of each of the sensing areas and data of the central area of another sensing area adjacent to the corresponding sensing area to generate the fingerprint data.

The sensor driver may receive a sensing signal corresponding to the reference member, and may merge data of the peripheral area of each of the sensing areas and data of the central area of another sensing area adjacent to the corresponding sensing area to generate the reference data.

The sensing areas may comprise a first sensing area and a second sensing area disposed at one side of the first sensing area. The sensor driver may receive a sensing signal corresponding to the user's fingerprint, may merge data of the peripheral area of the first sensing area and data of the central area of the second sensing area, and may merge data of the peripheral area of the second sensing area and data of the central area of the first sensing area to generate the fingerprint data.

The sensing areas may comprise a first sensing area and a second sensing area disposed at one side of the first sensing area. The sensor driver may receive a sensing signal corresponding to the reference member, may merge data of the peripheral area of the first sensing area and data of the central area of the second sensing area, and may merge data of the peripheral area of the second sensing area and data of the central area of the first sensing area to generate the reference data.

Each of the sensing areas may comprise: a central area in which information about the user's fingerprint is concentrated, a peripheral area surrounding the central area, and an extension area surrounding the peripheral area and comprising data generated based on the data of the central area and the data of the peripheral area.

The sensor driver may receive a sensing signal corresponding to the user's fingerprint, and may merge data of the peripheral area and extension area of each of the sensing areas and data of the central area of another sensing area adjacent to the corresponding sensing area to generate the fingerprint data.

The sensor driver may receive a sensing signal corresponding to the reference member, and may merge data of the peripheral area and extension area of each of the sensing areas and data of the central area of another sensing area adjacent to the corresponding sensing area to generate the reference data.

The sensor driver may comprise a first sensing area and a second sensing area disposed at one side of the first sensing area. The sensor driver may receive a sensing signal corresponding to the user's fingerprint, may merge data of the peripheral area and extension area of the first sensing area and data of the central area of the second sensing area, and may merge data of the peripheral area and extension area of the second sensing area and data of the central area of the first sensing area to generate the fingerprint data.

The sensor driver comprises a first sensing area and a second sensing area disposed at one side of the first sensing area. The sensor driver may receive a sensing signal corresponding to the reference member, may merge data of the peripheral area and extension area of the first sensing area and data of the central area of the second sensing area, and may merge data of the peripheral area and extension area of the second sensing area and data of the central area of the first sensing area to generate the reference data.

The data of the extension area may be generated based on an average value in difference values between the data of the central area of each of the plurality of sensing areas and the data of the peripheral area thereof.

A width of the peripheral area may be equal to a width of the extension area.

The sensor driver may comprise a memory generating reference data from reflected light by the reference member before a user's touch occurs, and storing the reference data. When the user's touch occurs, the sensor driver may recognize a user's fingerprint pattern based on a difference value between the reference data stored in the memory and the fingerprint data generated from the user's fingerprint.

The sensor driver may further comprise a comparator comprising a first input terminal receiving the reference data from the memory, a second input terminal receiving the fingerprint data, and an output terminal outputting a difference value between the reference data and the fingerprint data.

The reference member may be made of silicone or paper, and a surface of the reference member, the surface facing the fingerprint sensing layer, is flat.

According to an embodiment of the present disclosure, a display device comprises: a display panel displaying an image, a fingerprint sensing layer attached to one surface of the display panel and comprising a plurality of fingerprint sensors receiving reflected light and generating a sensing signal, and a sensor driver controlling operations of the plurality of fingerprint sensors. The sensor driver generates fingerprint data based on a sensing signal generated from reflected light by a user's fingerprint, and generates a fingerprint image based on prestored reference data and the fingerprint data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 16 is a diagram illustrating a plurality of sensing areas extracted from the fingerprint sensing layer of FIG. 15.

FIG. 17 is a diagram illustrating fingerprint data or reference data generated from data of the plurality of sensing areas of FIG. 16.

FIG. 21 is a diagram illustrating an extension area generated from each of the plurality of sensing areas of FIG. 20.

FIG. 22 is a diagram illustrating fingerprint data or reference data generated from data of the plurality of sensing areas of FIG. 21.

DETAILED DESCRIPTION

Figure 1:
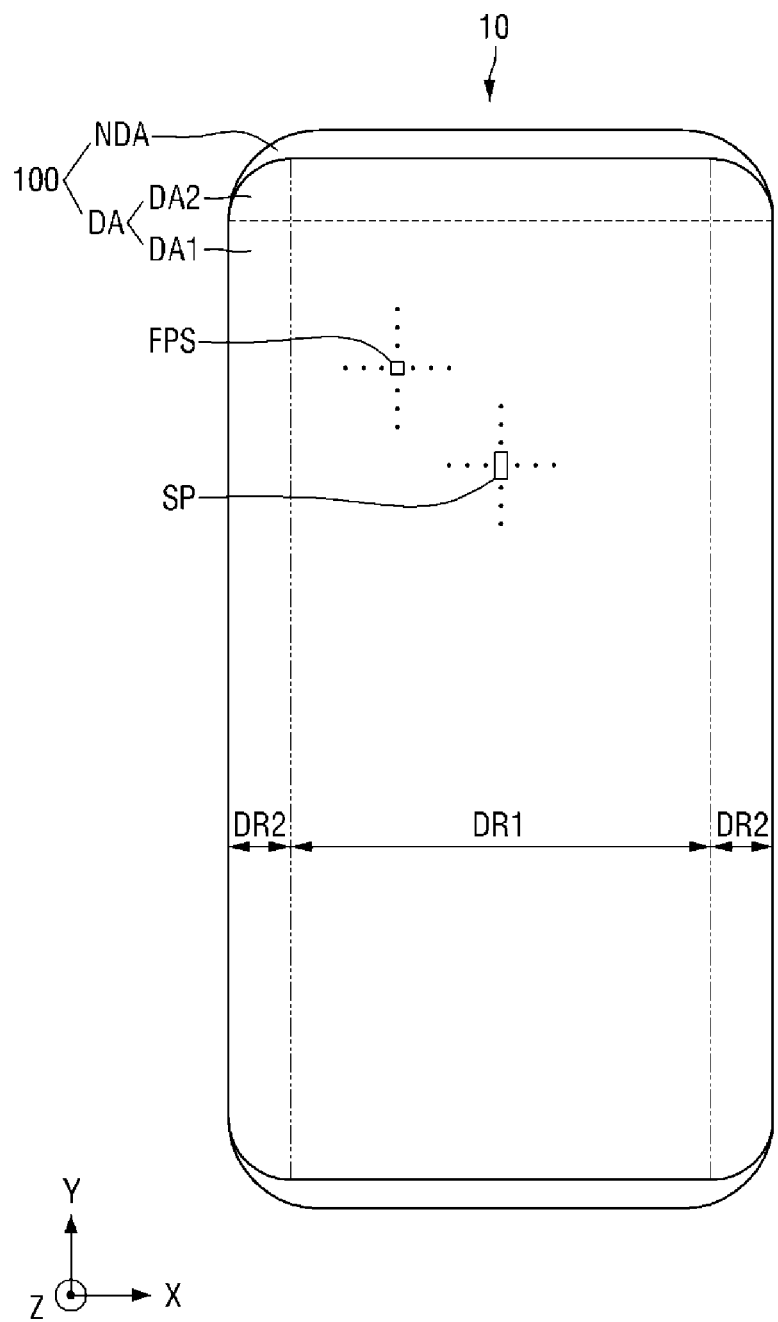
FIG. 1 is a plan view of a display device according to an embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a plan view of a display device according to an embodiment.

In this specification, the "on", "over", "top", "upper side", or "upper surface" refers to an upward direction with respect to the display device, that is, a Z-axis direction, 10, and the "beneath", "under", "bottom", "lower side", or "lower surface" refers to a downward direction with respect to the display device 10, that is, a direction opposite to the Z-axis direction. Further, the "left", "right", "upper", and "lower" refer to directions when the display device 10 is viewed from the plane. For example, the "left" refers to a direction opposite to the X-axis direction, the "right" refers to the X-axis direction, the "upper" refers to the Z-axis direction, and the "lower" refers to a direction opposite to the Z-axis direction.

Referring to FIG. 1, the display device 10, which is a device for displaying a moving image or a still image, may be used as a display screen of various products such as televisions, notebooks, monitors, billboards, and internet of things, as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs.

The display device 10 may include a first region DR1 and second regions DR2. The first region DR1 may be formed to be flat, and the second regions DR2 may extend from the left and right sides of the first region DR1. For example, the second regions DR2 may be formed to be flat or curved. When the second regions DR2 are formed to be flat, the angle formed by the first region DR1 and each of the second regions DR2 may be an obtuse angle. When the second regions DR2 are formed to be curved, each of the second regions DR2 may have a constant curvature or a variable curvature.

Although it is shown in FIG. 1 that the second regions DR2 extends from the left and right sides of the first region DR1, the present invention is not limited thereto. For example, the second region DR2 may extend from only one of the left and right sides of the first region DR1. As another example, the second region DR2 may extend from only one of the upper and lower sides of the first region DR1 as well as only one of the left and right sides of the first region DR1.

The display device 10 includes a display panel 100 displaying an image. The display panel 100 may include a display area DA and a non-display area NDA. The display area DA may include a first display area DA1 and a second display area DA2. The second display area DA2 may be disposed at one side, for example, an upper side of the first display area DA1. For example, the first and second display areas DA1 and DA2 may be disposed in the first region DR1 formed in a planar shape and the second regions DR2 formed in a curved shape.

The display area DA is an area for displaying an image, and may include a plurality of sub-pixels SP. The display area DA may be used as a detection member for detecting an external environment. For example, the display area DA may correspond to a fingerprint recognition area for recognizing a user's fingerprint. Therefore, the display area DA may include a plurality of sub-pixels SP and a plurality of fingerprint sensors FPS. The display area DA may be used as an area for displaying an image and recognizing a user's fingerprint. For example, the display panel 100 on which the plurality of sub-pixels SP are arranged may overlap the fingerprint sensing layer on which the plurality of fingerprint sensors FPS are arranged in the third direction (Z-axis direction).

For example, the first display area DA1 may correspond to a main display area including the plurality of sub-pixels SP. The second display area DA2 may include a pixel region including the plurality of sub-pixels SP and a light transmission region transmitting light. The second display area DA2 may correspond to a sensor area in which the number of sub-pixels SP per unit area is smaller than that of the first display area DA1. As the area of the light transmission region of the second display area DA2 increases, the number of sub-pixels SP per unit area of the second display area DA2 may be smaller than the number of sub-pixels SP per unit area of the first display area DA1.

The non-display area NDA may be defined as the remaining area of the display panel 100 except for the first and second display areas DA1 and DA2. For example, the non-display area NDA may include a scan driver for applying scan signals to scan lines, fan-out lines connecting data lines and a display driver, and pads connected to a circuit board.

For example, the non-display area NDA may be opaque. The non-display area NDA may be formed as a decorative layer in which a pattern that can be seen to a user is formed.

Figure 2:
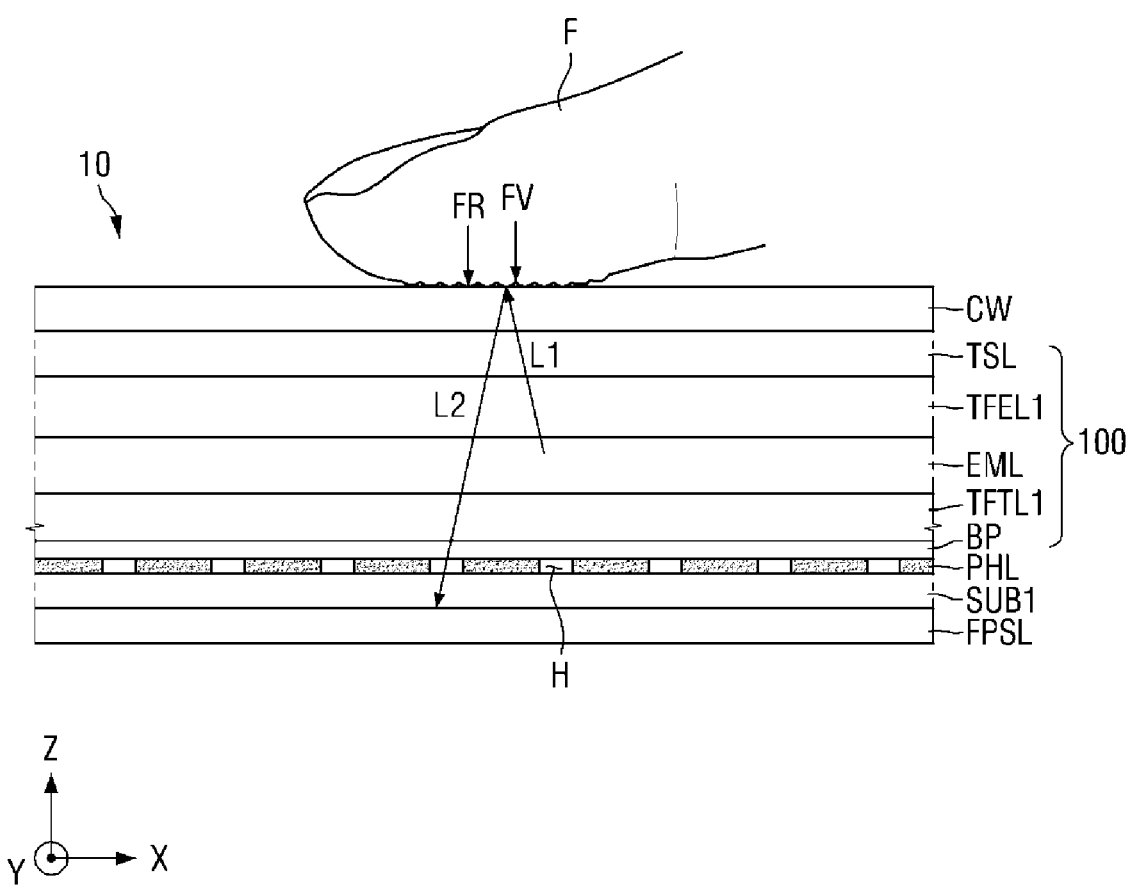
FIG. 2 is a cross-sectional view of a display device according to an embodiment.
Figure 3:
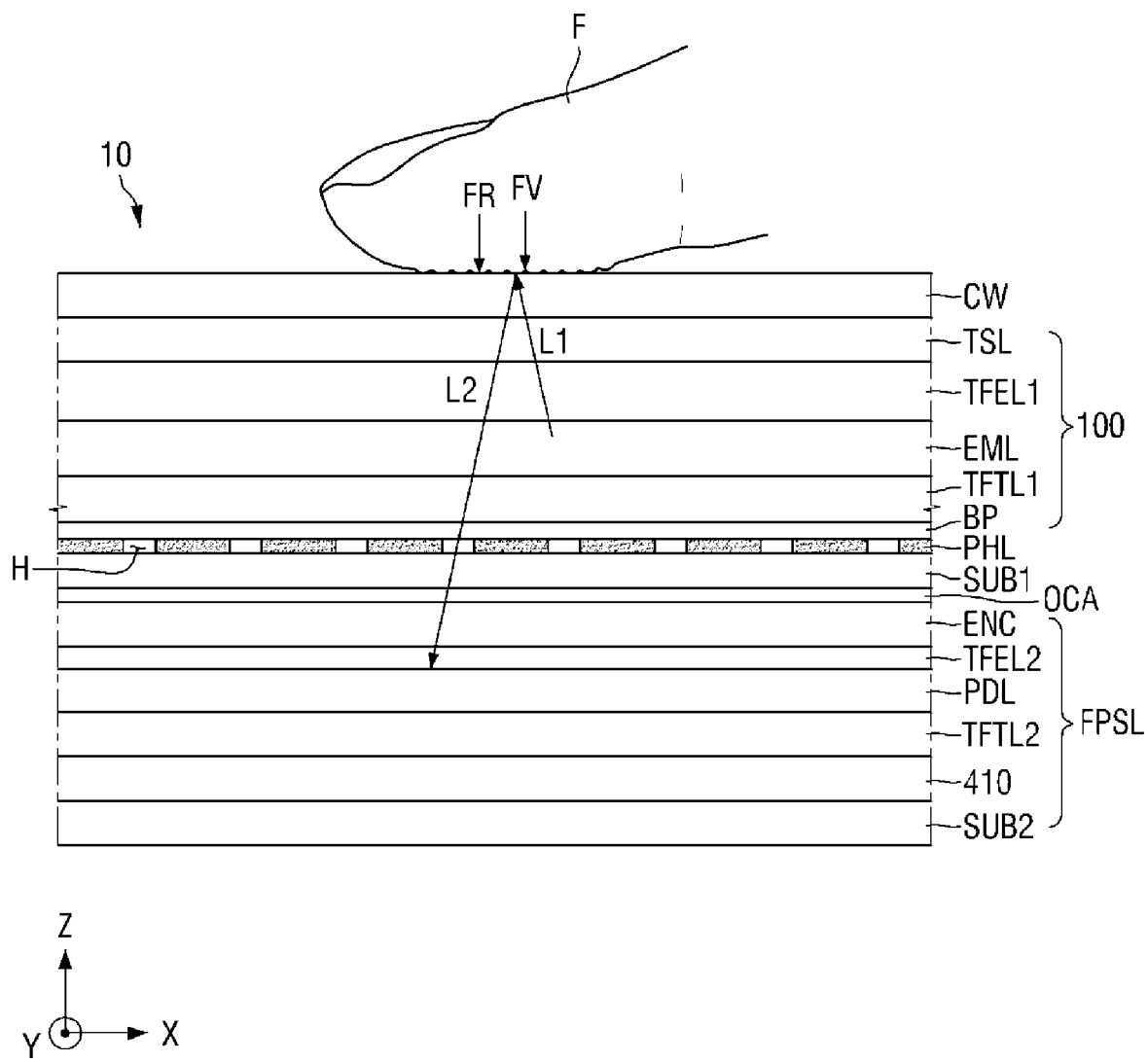
FIG. 3 is a cross-sectional view showing a fingerprint sensing layer in the display device of FIG. 2.

FIG. 2 is a cross-sectional view of a display device according to an embodiment, and FIG. 3 is a cross-sectional view showing a fingerprint sensing layer in the display device of FIG. 2.

Referring to FIGS. 2 and 3, the display device 10 may include a first substrate SUB1, a light blocking layer PHL, a display panel 100, a cover window CW, and a fingerprint sensing layer FPSL. The display panel 100 may include a back plane BP, a first thin film transistor layer TFTL1, a light emitting element layer EML, a first thin film encapsulation layer TFEL1, and a touch sensor layer TSL.

The first substrate SUB1 may be a base substrate, and may include an insulating material such as a polymer resin. For example, the first substrate SUB1 may include polyethersulfone (PES), polyacrylate (PAC), polyarylate (PAR), polyetherimide (PEI), polyethylene naphthalate (PEN), polyethylene terephthalate (PET), polyphenylene sulfide (PPS), polyimide (PI), polycarbonate (PC), cellulose triacetate (CTA), cellulose acetate propionate (CAP), or a combination thereof.

For example, the first substrate SUB1 may be a rigid substrate. As another example, the first substrate SUB1 may be a flexible substrate capable of bending, folding, rolling, or the like. When the first substrate SUB1 is a flexible substrate, the first substrate SUB1 may be formed of polyimide PI, but the material thereof is not necessarily limited thereto.

The light blocking layer PHL may cover the lower surface of the first thin film transistor layer TFTL1. The light blocking layer PHL may be disposed between the first substrate SUB1 and the first thin film transistor layer TFTL1 to block light incident on the first thin film transistor layer TFTL1 and the light emitting element layer EML.

For example, the light blocking layer PHL may be formed as a single layer or multiple layers each including any one of molybdenum (Mo), aluminum (Al), chromium (Cr), gold (Au), titanium (Ti), nickel (Ni), neodymium (Nd), and copper (Cu), or an alloy thereof. As another example, the light blocking layer PHL may be formed of a black matrix, and may be formed of various materials having light blocking properties.

The light blocking layer PHL may include a plurality of holes H. The plurality of holes H may be optical paths of second light L2 that is converted by the reflection of first light L1 emitted from the light emitting element layer EML to a user's body and travels to the fingerprint sensing layer FPSL. For example, each of the plurality of holes H may correspond to a space surrounded by the first substrate SUB1, the inner wall of the hole H of the light blocking layer PHL, and the back plane BP. As another example, the plurality of holes H may be filled with a material constituting the back plane BP in the process of forming the back plane BP on the light blocking layer PHL. Even in this case, the plurality of holes H may also be optical paths of second light L2 that is converted by the reflection of first light L1 emitted from the light emitting element layer EML to a user's body and travels to the fingerprint sensing layer FPSL.

The plurality of holes H may not overlap a plurality of thin film transistors of the first thin film transistor layer TFTL1, and the light blocking layer PHL may overlap the plurality of thin film transistors of the first thin film transistor layer TFTL1. For example, the plurality of holes H may be arranged along the first direction (X-axis direction) and the second direction (Y-axis direction). The size of each of the plurality of holes H may be determined depending on the path of the second light L2.

The back plane BP may be disposed on the light blocking layer PHL to support the first thin film transistor layer TFTL1. For example, the backplane BP may include an insulating material such as a polymer resin.

For example, the backplane BP may be a rigid substrate. As another example, the backplane BP may be a flexible substrate capable of bending, folding, rolling, or the like. When the back plane BP is a flexible substrate, the back plane BP may be formed of polyimide PI, but the material thereof is not necessarily limited thereto.

The first thin film transistor layer TFTL1 may be disposed on the back plane BP. The first thin film transistor layer TFTL1 may include at least one thin film transistor for driving each of the plurality of sub pixels SP. At least one thin film transistor of the sub pixel SP may include a semiconductor layer, a gate electrode, a drain electrode, and a source electrode. For example, the first thin film transistor layer TFTL1 may further include scan lines, data lines, power supply lines, and scan control lines, which are connected to at least one thin film transistor of the sub-pixel SP, and routing lines for connecting pads and the data lines.

The light emitting element layer EML may be disposed on the first thin film transistor layer TFTL1. The light emitting element layer EML may include a light emitting element connected to at least one thin film transistor of the first thin film transistor layer TFTL1. The light emitting element may include a first electrode, a light emitting layer, and a second electrode. For example, the light emitting layer may be an organic light emitting layer including an organic material, but is not necessarily limited thereto. When the light emitting layer corresponds to the organic light emitting layer, when the thin film transistor of the first thin film transistor layer TFTL1 applies a predetermined voltage to the first electrode of the light emitting element, and the second electrode of the light emitting element receives a common voltage or a cathode voltage, holes and electrons may move to the organic light emitting layer through a hole transport layer and an electron transport layer, respectively, and the holes and electrons may be combined with each other in the organic light emitting layer to emit light.

The light emitting element layer EML may include a pixel defining film defining a plurality of sub pixels SP. The first electrode and light emitting layer of the light emitting element may be spaced apart from and insulated from each other by the pixel defining film.

The first thin film encapsulation layer TFEL1 may be disposed on the light emitting element layer EML to cover the first thin film transistor layer TFTL1 and the light emitting element layer EML. The first thin film encapsulation layer TFEL1 may prevent oxygen or moisture from penetrating into the light emitting element layer EML. For example, the first thin film encapsulation layer TFEL1 may include at least one inorganic layer. The first thin film encapsulation layer TFEL1 may include an inorganic layer such as a silicon nitride layer, a silicon oxy nitride layer, a silicon oxide layer, a titanium oxide layer, or an aluminum oxide layer, but the present invention is not limited thereto.

The first thin film encapsulation layer TFEL1 may protect the light emitting element layer EML from foreign matter such as dust. For example, the first thin film encapsulation layer TFEL1 may include at least one organic layer. The first thin film encapsulation layer TFEL1 may include an organic layer including an acrylic resin, an epoxy resin, a phenolic resin, a polyamide resin, or polyimide resin, but the present invention is not limited thereto.

The touch sensor layer TSL may be disposed on the first thin film encapsulation layer TFEL1. Since the touch sensor layer TSL is directly disposed on the first thin film encapsulation layer TFEL1, the thickness of the display device 10 may be reduced as compared with a case where a separate touch panel including the touch sensor layer TSL is attached onto the first thin film encapsulation layer TFEL1.

The touch sensor layer TSL may include touch electrodes for sensing a user's touch, and touch electrode lines for connecting pads and touch electrodes. The touch electrodes of the touch sensor layer TSL may be disposed in a touch sensing area overlapping the display area DA of the display panel 100.

The cover window CW may be disposed on the display panel 100. The cover window CW may be disposed on the touch sensor layer TSL of the display panel 100. For example, the cover window CW may be attached onto the touch sensor layer TSL by a transparent adhesive member. The cover window CW may be in direct contact with a user's finger F.

The fingerprint sensing layer FPSL may be disposed under the display panel 100. For example, the fingerprint sensing layer FPSL may be attached to the lower surface of the first substrate SUB1 through an adhesive member OCA. For example, the adhesive member OCA may be an optical clear adhesive member, but is not limited thereto. The upper surface of the first substrate SUB1 may face the display panel 100 or the light blocking layer PHL, and the lower surface of the first substrate SUB1 may face the fingerprint sensing layer FPSL.

The fingerprint sensing layer FPSL may include a plurality of fingerprint sensors FPS shown in FIG. 1, and the plurality of fingerprint sensors FPS may be connected to the sensor driver. The plurality of fingerprint sensors FPS may be optical fingerprint sensors. For example, the plurality of fingerprint sensors FPS may include a photo diode, a CMOS image sensor, a CCD camera, and a photo transistor, but are not limited thereto. The plurality of fingerprint sensors FPS may recognize a fingerprint by sensing the light reflected by a valley FV between ridges FR of the finger F.

For example, when the user's finger F touches the upper surface of the cover window CW, the first light L1 output from the light emitting element layer EML may be reflected by the ridge FR or valley FV of the finger F, and the reflected second light L2 may pass through the hole H of the light blocking layer PHL to reach the fingerprint sensing layer FPSL disposed under the first substrate SUB1. The sensor driver may distinguish the second light L2 reflected from the ride FR of the finger F and the second light L2 reflected from the valley FV of the finger F to generate a fingerprint image, thereby recognizing a pattern of a user's fingerprint. Therefore, the plurality of holes H of the light blocking layer PHL may be paths of the second light L2 reflected by the user's finger F.

In the display device 10, the fingerprint sensing layer FPSL may be disposed under the display panel 100 to simplify the process, and the fingerprint sensors FPS may not be disposed in the path (for example, the upper end of the light emitting element layer EML) through which the first light L1 is output, so as to prevent the degradation of resolution.

The fingerprint sensing layer FPSL may include a second substrate SUB2, a buffer layer 410, a second thin film transistor layer TFTL2, a light receiving element layer PDL, and a second thin film encapsulation layer TFTL2, as shown in FIG. 3.

The second substrate SUB2 may be a base substrate of the fingerprint sensing layer FPSL, and may include an insulating material such as a polymer resin. The first substrate SUB1 may be a base substrate, and may include an insulating material such as a polymer resin. For example, the second substrate SUB2 may be a rigid substrate. As another example, the second substrate SUB2 may be a flexible substrate capable of bending, folding, rolling, or the like. When the second substrate SUB2 is a flexible substrate, the second substrate SUB2 may be formed of polyimide PI, but the material thereof is not necessarily limited thereto.

The buffer layer 410 may be disposed on the second substrate SUB2. The buffer layer 410 may be formed of an inorganic layer capable of preventing the penetration of air or moisture. For example, the buffer layer 410 may include a plurality of inorganic layers that are alternately stacked. The buffer layer 410 may be formed as a multilayer film in which at least one inorganic layer of a silicon nitride layer, a silicon oxy nitride layer, a silicon oxide layer, a titanium oxide layer, and an aluminum oxide layer is alternately stacked, but is not limited thereto.

The second thin film transistor layer TFTL2 may be disposed on the buffer layer 410. The second thin film transistor layer TFTL2 may include at least one thin film transistor for driving each of the plurality of fingerprint sensors FPS. At least one thin film transistor of the fingerprint sensor FPS may include a semiconductor layer, a gate electrode, a drain electrode, and a source electrode. For example, the second thin film transistor layer TFTL2 may further include scan lines, readout lines, and common voltage lines, which are connected to at least one thin film transistor of the fingerprint sensor FPS.

The light receiving element layer PDL may be disposed on the second thin film transistor layer TFTL2. The light receiving element layer PDL may include a light receiving element connected to at least one thin film transistor of the second thin film transistor layer TFTL2. The light receiving element may include a first electrode, a light receiving layer, and a second electrode. For example, the light receiving layer may be an organic light receiving layer including an organic material, but is not necessarily limited thereto. When the light receiving layer corresponds to an organic light receiving layer, the organic light receiving layer may receive the second light L2 to combine holes and electrons, and may convert energy of the second light L2 into an electrical signal (current or voltage) formed between the first electrode and the second electrode.

The light receiving element layer PDL may include a sensor defining film defining the plurality of fingerprint sensors FPS. The first electrode and light receiving layer of the light receiving element may be spaced apart from and insulated from each other by the sensor defining film.

The second thin film encapsulation layer TFEL2 may be disposed on the light receiving element layer PDL. The second thin film encapsulation layer TFEL2 may cover the upper surface of the light receiving element layer PDL, and may prevent oxygen or moisture from penetrating into the light receiving element layer PDL. For example, the second thin film encapsulation layer TFEL2 may include at least one inorganic layer. The second thin film encapsulation layer TFEL2 may include an inorganic layer such as a silicon nitride layer, a silicon oxy nitride layer, a silicon oxide layer, a titanium oxide layer, or an aluminum oxide layer, but the present invention is not limited thereto.

The second thin film encapsulation layer TFEL2 may protect the light receiving element layer PDL from foreign matter such as dust. For example, the second thin film encapsulation layer TFEL2 may include at least one organic layer. The second thin film encapsulation layer TFEL2 may include an organic layer including an acrylic resin, an epoxy resin, a phenolic resin, a polyamide resin, or polyimide resin, but the present invention is not limited thereto.

The fingerprint sensing layer FPSL may further include an encapsulation substrate ENC disposed on the second thin film encapsulation layer TFEL2. The encapsulation substrate ENC may cover the second thin film encapsulation layer TFEL2 to prevent air or moisture from penetrating the fingerprint sensing layer FPSL. For example, the encapsulation substrate ENC may be a light transmitting substrate such as a glass substrate. As shown in FIG. 3, the encapsulation substrate ENC may be disposed at the uppermost portion of the fingerprint sensing layer FPSL, but is not limited thereto. For example, the encapsulation substrate ENC may be flexible, transparent, semi-transparent or even be omitted.

Figure 4:
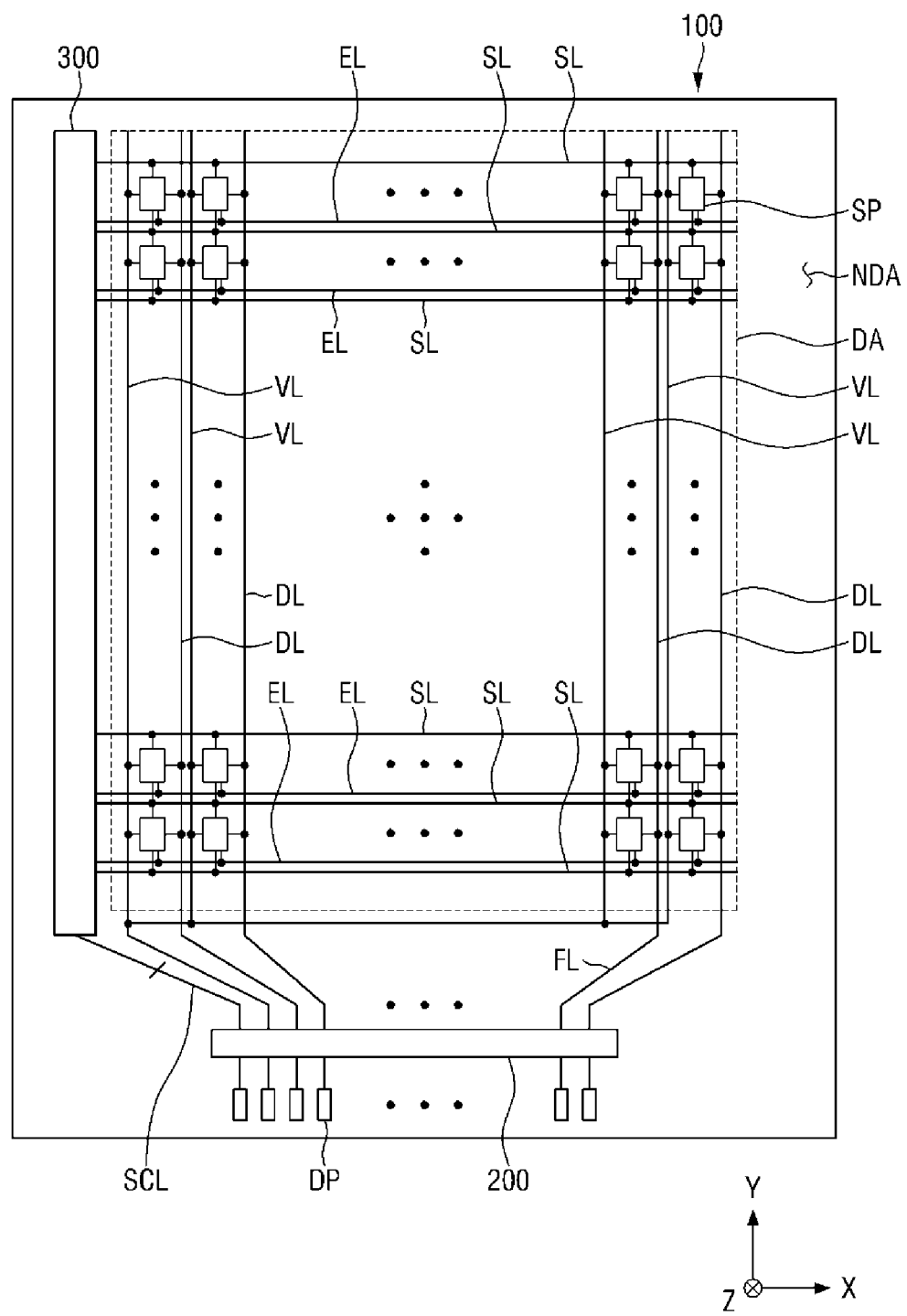
FIG. 4 is a view showing a connection relationship between sub-pixels and lines in a display device according to an embodiment.

FIG. 4 is a view showing a connection relationship between sub-pixels and lines in a display device according to an embodiment.

Referring to FIG. 4, the display panel 100 may include a display area DA and a non-display area NDA.

The display area DA may include a plurality of sub-pixels SP, and voltage supply lines VL, scan lines SL, emission lines EL, and data lines DL, which are connected to the plurality of sub-pixels SP.

Each of the sub-pixels SP may be connected to at least one scan line SL, at least one data line DL, at least one emission line EL, and at least one voltage supply line VL. In FIG. 4, each of the sub pixels SP may be connected to two scan lines SL, one data line DL, one emission line EL, and one voltage supply line VL, but the present invention is not limited thereto. For example, each of the sub-pixels SP may be connected to three or more scan lines SL.

Each of the sub pixels SP may include a driving transistor, at least one switching transistor, a light emitting element, and a capacitor. The driving transistor may emit light by supplying a driving current to the light emitting element in response to a data voltage applied to the gate electrode. For example, the driving transistor and the at least one switching transistor may be thin film transistors. The light emitting element may emit light having a predetermined luminance according to the magnitude of the driving current of the driving transistor. For example, the light emitting element may be an organic light emitting diode including a first electrode, an organic light emitting layer, and a second electrode. The capacitor may maintain the data voltage applied to the gate electrode of the driving transistor constant.

The sub-pixels SP may receive a driving voltage VDD through the voltage supply lines VL. Here, the driving voltage VDD may be a high-potential voltage for driving the light emitting elements of the sub-pixels SP.

The plurality of voltage supply lines VL may be spaced apart from each other in the first direction (X-axis direction) and may extend in the second direction (Y-axis direction). For example, each of the plurality of voltage supply lines VL may be disposed along a column of sub-pixels SP arranged in the display area DA. Each of the plurality of voltage supply lines VL may be connected to the sub-pixels SP disposed in the same column, and may supply the driving voltage VDD to the sub-pixels SP.

The scan lines SL and the emission lines EL may extend in a first direction (X-axis direction), and may be spaced apart from each other in a second direction (Y-axis direction) crossing the first direction (X-axis direction). The scan lines SL and the emission lines EL may be formed in parallel with each other.

The data lines DL may be spaced apart from each other in the first direction (X-axis direction), and may extend in the second direction (Y-axis direction). The data lines DL may be formed in parallel with the voltage supply line VL.

The non-display area NDA may be defined as an area other than the display area DA of the display panel 100. The non-display area NDA may include a scan driver 300 for applying scan signals to the scan lines SL, fan-out lines FL connecting the data lines DL and the display driver 200, and pads DP connected to the circuit board. The pads DP, as compared with the display driver 200, may be disposed closer to one edge of the display panel 100.

The display driver 200 may be connected to the pads DP to receive digital video data and timing signals. The display driver 200 may convert the digital video data into analog positive/negative data voltages and supply the analog positive/negative data voltages to the data lines DL through the fan-out lines FL.

For example, the display driver 200 may be formed as an integrated circuit (IC), and may be attached onto the first substrate SUB1 by a chip on glass (COG) method, a chip on plastic (COP) method, or an ultrasonic bonding method. However, the present invention is not limited thereto.

The display driver 200 may generate a scan control signal and supply the scan control signal to the scan driver 300 through the scan control lines SCL.

The scan driver 300 may be disposed at one side of the non-display area NDA. The scan driver 300 may include a plurality of thin film transistors for generating scan signals in response to the scan control signal. The scan driver 300 may supply scan signals to the sub-pixels SP based on the scan control signal to select the sub-pixels SP to which data voltages will be supplied.

Figure 5:
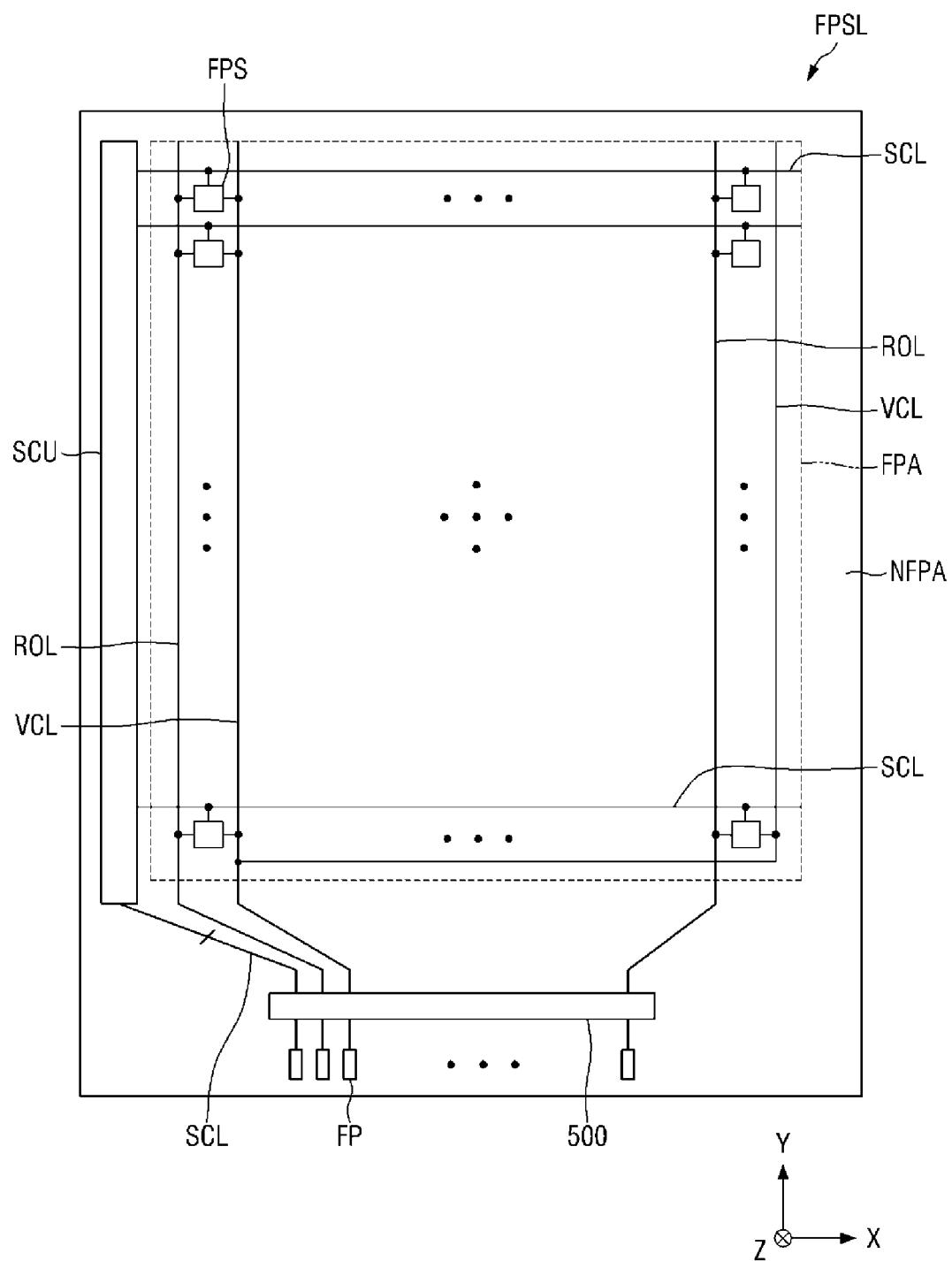
FIG. 5 is a view showing a connection relationship between fingerprint sensors and lines in a display device according to an embodiment.
Figure 6:
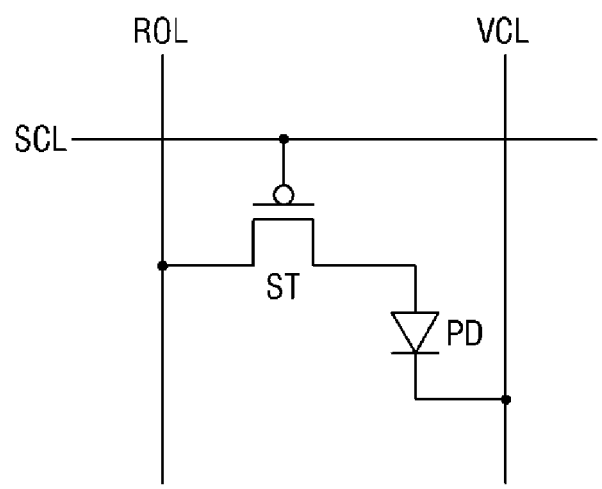
FIG. 6 is a circuit diagram showing a switching transistor and a fingerprint sensor in a display device according to an embodiment.

FIG. 5 is a view showing a connection relationship between fingerprint sensors and lines in a display device according to an embodiment, and FIG. 6 is a circuit diagram showing a switching transistor and a fingerprint sensor in a display device according to an embodiment.

Referring to FIGS. 5 and 6, the fingerprint sensing layer FPSL may include a fingerprint recognition area FPA and a non-fingerprint recognition area NFPA.

The fingerprint recognition area FPA may include a plurality of fingerprint sensors FPS, a plurality of scan lines SCL connected to the fingerprint sensors FPS, a plurality of readout lines ROL, and a plurality of common voltage lines VCL. For example, the distance between the plurality of fingerprint sensors FPS may be 5 µm to 50 µm, and one fingerprint pixel on the cover window CW may correspond to 20 to 30 fingerprint sensors FPS of the fingerprint sensing layer FPSL. However, the present invention is not limited thereto.

Each of the plurality of fingerprint sensors FPS may be connected to the scan driver SCU through scan lines SCL, and may receive scan signals from the scan driver SCU. The scan lines SCL may extend in the first direction (X-axis direction) and may be spaced apart from each other in the second direction (Y-axis direction). The scan driver SCU may supply scan signals to the plurality of fingerprint sensors FPS, thereby selecting fingerprint sensors FPS to sense a change in sensing signals.

Each of the plurality of fingerprint sensors FPS may be connected to the sensor driver 500 through read-out lines ROL, and may supply sensing signals to the sensor driver 500. The readout lines ROL may be spaced apart from each other in the first direction (X-axis direction), and may extend in the second direction (Y-axis direction).

The non-fingerprint recognition area NFPA may be disposed outside the fingerprint recognition area FPA. The non-fingerprint recognition area NFPA may be defined as an area other than the fingerprint recognition area FPA. For example, the scan driver SCU may be disposed at one side of the non-fingerprint recognition area NFPA and connected to the scan lines SCL extending to the fingerprint recognition area FPA.

The sensor driver 500 may be disposed at the other side of the non-fingerprint recognition area NFPA, which is perpendicular to the one side thereof, and may be connected to the readout line ROL extending to the fingerprint recognition area NFPA. The sensor driver 500 may supply a sensing driving voltage to the plurality of fingerprint sensors FPS, and may recognize a pattern of a user's fingerprint by receiving a sensing signal by the touch of a user's finger F.

For example, the user's finger touches the cover window CW, the sensing signal of the fingerprint sensor FPS receiving the scan signal may be changed. The sensing signal of the fingerprint sensor FPS receiving the light reflected by the ridge FR of the finger F may be different from the sensing signal of the fingerprint sensor FPS receiving the light reflected by the valley FV of the finger F. The sensor driver may recognize a difference between the sensing signals to determine whether the ridge FR of the finger F touches the fingerprint pixel of the cover window CW corresponding to the fingerprint sensor FPS or whether the valley FV of the finger F touches the fingerprint pixel of the cover window CW. Accordingly, the sensor driver 500 may recognize the pattern of the user's fingerprint based on the sensing signals.

The non-fingerprint recognition area NFPA may further include fingerprint recognition pads FP disposed at one edge of the fingerprint sensing layer FPSL. The fingerprint recognition pads FP may be connected to the sensor driver 500 to supply signals applied from an external integrated circuit to the sensor driver 500.

In FIG. 6, the fingerprint sensor FPS may include a switching transistor ST and a light receiving element PD.

The switching transistor ST may supply a sensing driving voltage to the light receiving element PD based on the scan signal applied to the gate electrode. For example, the gate electrode of the switching transistor ST may be connected to the scan line SCL, the first electrode may be connected to the readout line ROL, and the second electrode may be connected to the first electrode of the light receiving element PD. The first electrode of the switching transistor ST may be a source electrode, and the second electrode thereof may be a drain electrode. When a source-gate voltage Vsg of the switching transistor ST exceeds a threshold voltage Vth of the switching transistor ST, a driving current may flow through a channel of the switching transistor ST.

The light receiving element PD may recognize a pattern of a user's fingerprint based on the second light L2 reflected from the finger F of a user. The first electrode of the light receiving element PD may be connected to the second electrode of the switching transistor ST, and the second electrode thereof may be connected to the common voltage line VCL. For example, the second electrodes of the plurality of light receiving elements PD may be formed as a common electrode and may be connected to the common voltage line VCL. The common voltage line VCL may supply a low-potential voltage to the second electrode of the light receiving device element.

For example, the light receiving element PD may not receive light when there is no body contact of the user on the cover window CW. When the light receiving element PD does not receive light, the light receiving element PD may output a driving current input to the first electrode to the second electrode.

The light receiving element PD may receive the second light L2 reflected by the ridge FR or valley FV of the finger F when the user's finger F contacts the cover window CW. The first light L1 output from the light emitting element layer EML may be reflected by the ridge FR or valley FV of the finger F, and the reflected second light L2 may reach the light receiving element PD of the fingerprint sensing layer FPSL. The light receiving element PD may convert energy of the second light L2 into an electrical signal (current or voltage) formed between the first electrode and the second electrode, and the converted electrical signal may be supplied to the sensor driver 500 as a sensing signal. For example, when a reverse bias is formed between the first electrode and second electrode of the light receiving element PD, a current opposite to the driving current may flow in proportion to the light amount of the second light L2. Accordingly, when the light receiving element PD receives the second light L2, the reverse current output from the light receiving element PD may flow into the switching transistor ST, and may be applied to the sensor driver 500 as a sensing signal.

The sensor driver 500 determines whether the sensing signal received from the fingerprint sensor FPS corresponds to the ride FR of the finger F or corresponds to the valley FV of the finger F, thereby recognizing the pattern of the user's fingerprint.

For example, the light receiving device PD may be implemented as a photo transistor or a photo diode, but is not necessarily limited thereto. The light receiving element PD may correspond to an optical sensor converting light energy into electrical energy, and may use a photovoltaic effect in which a flowing current changes in accordance with light intensity.

Figure 7:
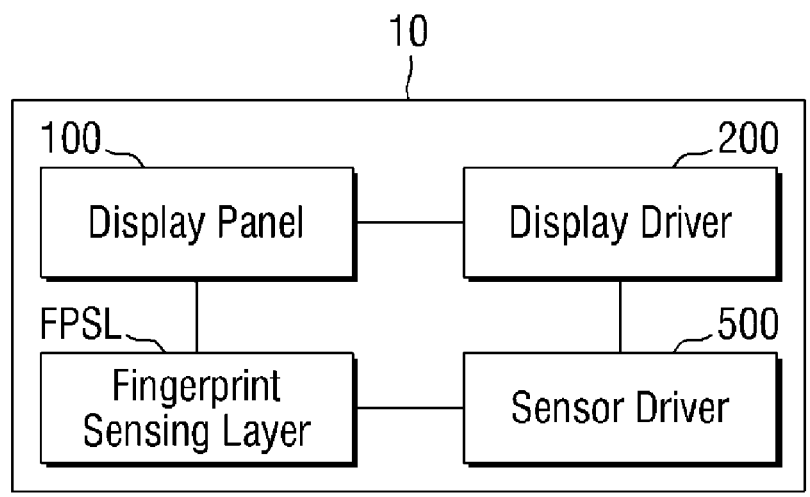
FIG. 7 is a block diagram showing a display device according to an embodiment.

FIG. 7 is a block diagram showing a display device according to an embodiment.

Referring to FIG. 7, the display device 10 may include a display panel 100, a display driver 200, a fingerprint sensing layer FPSL, and a sensor driver 500.

The display driver 200 may supply an image driving signal to the display panel 100 to control an image display operation of the display panel 100. The display driver 200 may generate an image driving signal based on digital video data and a timing signal supplied from the outside. For example, the display driver 200 may receive digital video data and a timing signal from a host (not shown), and the timing signal may include a vertical synchronization signal, a horizontal synchronization signal, and a clock signal. Further, the image driving signal may include a scan signal, an emission signal, and a data signal.

The sensor driver 500 may recognize a user's fingerprint by controlling operations of the plurality of fingerprint sensors FPS of the fingerprint sensing layer FPSL. For example, the sensor driver 500 may supply a sensing driving voltage to the plurality of fingerprint sensors FPS, and may receive a sensing signal by a touch of the finger F. The fingerprint sensor FPS may supply different sensing signals to the sensor driver 500 based on the energy of light reflected from each of the ridge FR and the valley FV of the finger F. The sensor driver 500 may recognize a user's fingerprint based on a sensing signal corresponding to each of the plurality of fingerprint pixels of the cover window CW.

For example, the display driver 200 and the sensor driver 500 may be integrated into one configuration. The display driver 200 and the sensor driver 500 may be implemented as one integrated circuit (IC), but the present invention is not limited thereto.

Figure 8:
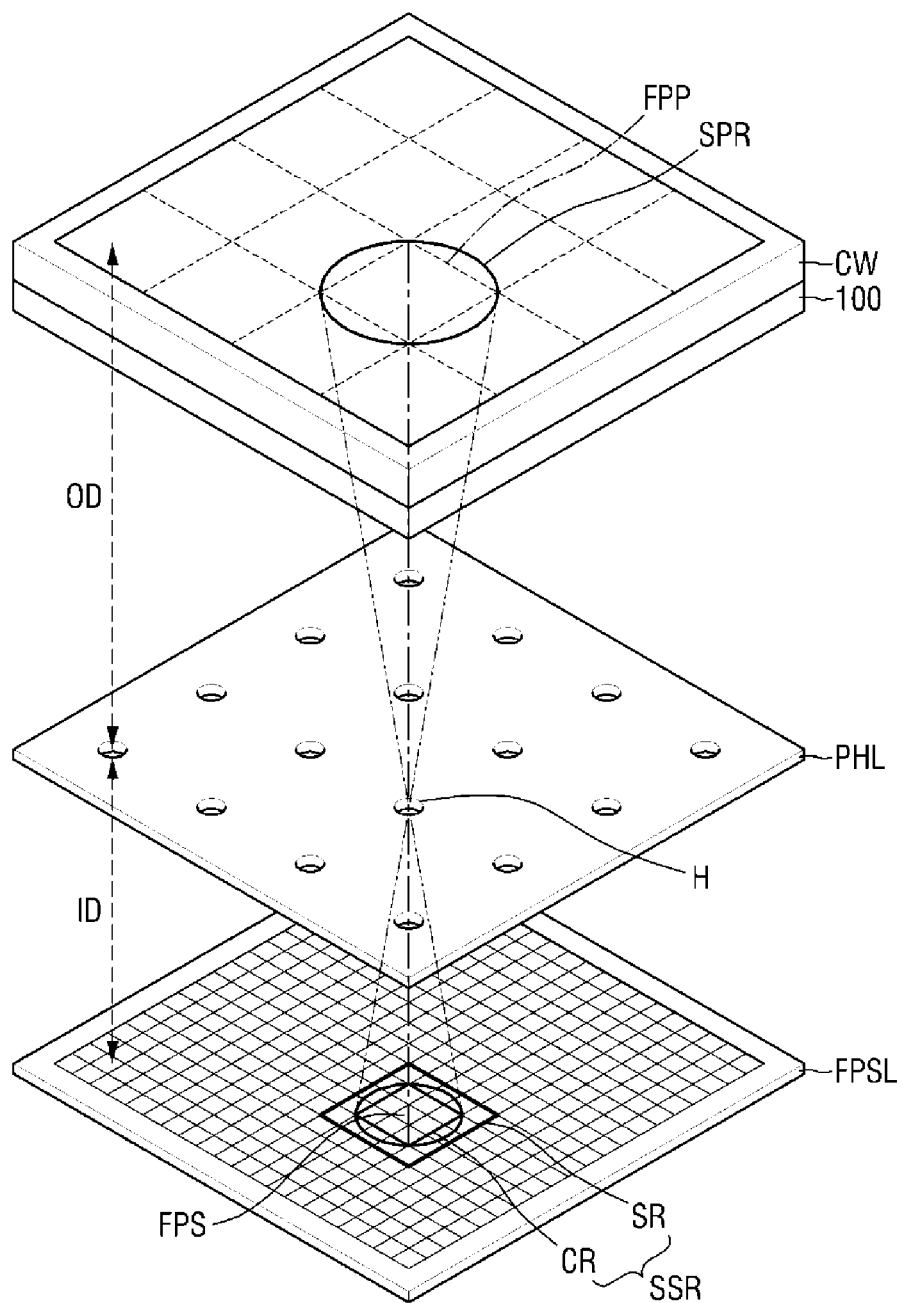
FIG. 8 is a perspective view showing a path of reflected light in a display device according to an embodiment.
Figure 9:
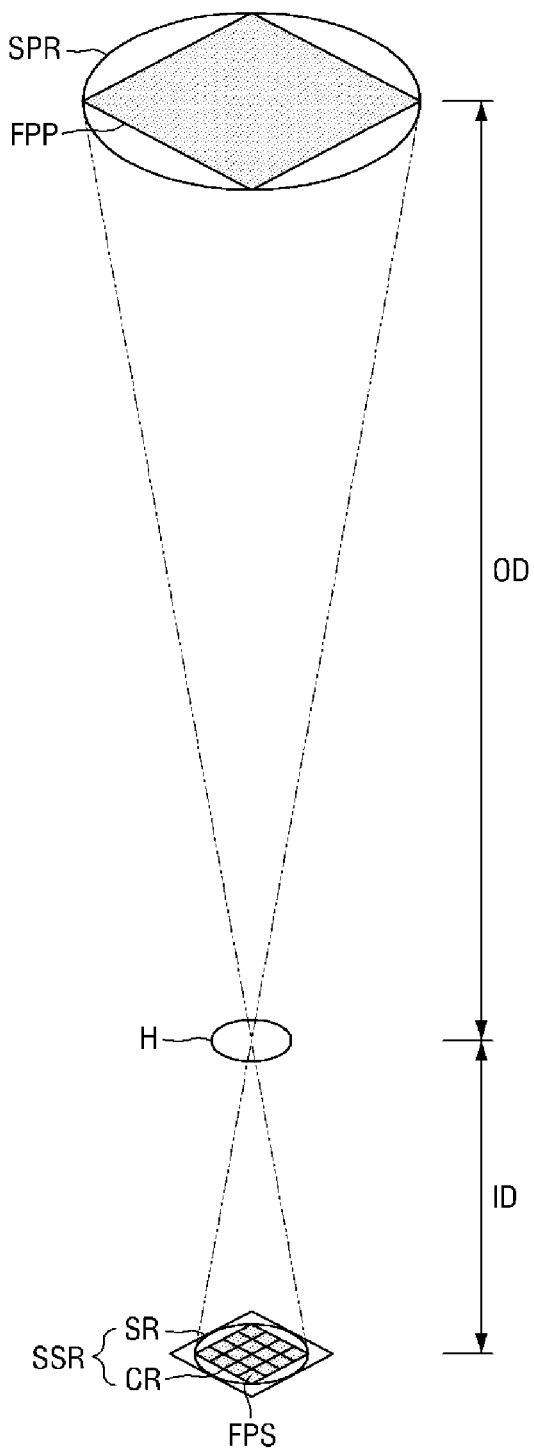
FIG. 9 is a view illustrating a fingerprint pixel and a sensor pixel in a display device according to an embodiment.

FIG. 8 is a perspective view showing a path of reflected light in a display device according to an embodiment, and FIG. 9 is a view illustrating a fingerprint pixel and a sensor pixel in a display device according to an embodiment.

Referring to FIGS. 8 and 9, the display device 10 may include a cover window CW, a display panel 100, a light blocking layer PHL, and a fingerprint sensing layer FPSL.

The cover window CW may include a plurality of fingerprint pixels FPP and a sampling region SPR surrounding each of the plurality of fingerprint pixels FPP. The fingerprint sensing layer FPSL may include a plurality of fingerprint sensors FPS, and a sensing area SSR surrounding the plurality of fingerprint sensors FPS and corresponding to one fingerprint pixel FPP and one hole H.

Each of the plurality of fingerprint pixels FPP may correspond to one hole H of the light blocking layer PHL. Each of the sensing areas SSR may correspond to one hole H of the light blocking layer PHL. For example, when the user's finger F touches the cover window CW, each of the plurality of sampling regions SPR may reflect the first light L1 output from the display panel 100, and the second light L2 reflected from each of the plurality of sampling regions SPR may pass through the hole H of the light blocking layer PHL to reach the sensing area SSR of the fingerprint sensing layer FPSL. The plurality of holes H of the light blocking layer PHL may be paths of the second light L2 reflected by the user's finger F. Accordingly, the plurality of fingerprint sensors FPS may sense the second light L2 reflected by the ridge FR or valley FV of the finger F contacting the sampling region SPR on the cover window CW.

The plurality of fingerprint sensors FPS may generate a sensing signal by sensing the second light L2 reflected by the ridge FR or valley FV of the finger F, and may supply the sensing signal to the sensor driver 500. The sensor driver 500 may distinguish the sensing signal corresponding to the ridge FR of the finger F from the sensing signal corresponding to the valley FV of the finger F. Therefore, the sensor driver 500 may recognize a fingerprint pattern of the finger contacting the sampling region SPR by combining the sensing signals of each of the plurality of fingerprint sensors FPS.

Each of the sensing areas SSR may include a central area CR and a peripheral area SR. The central area CR may include at least one fingerprint sensor FPS disposed at the center of the sensing area SSR. The second light L2 reflected by the user's finger F may intensively reach the center region CR. Therefore, at least one fingerprint sensor FPS of the central area CR may concentrate the user's fingerprint information.

The peripheral area SR may surround the central area CR. The peripheral area SR may include at least one fingerprint sensor FPS surrounding the central area CR. For example, some fingerprint sensors FPS in the peripheral area SR may receive the reflected second light L2, and other fingerprint sensors FPS in the peripheral area SR may not receive the reflected second light L2. As another example, the average intensity of the second light L2 reaching the fingerprint sensor FPS in the peripheral area SR may be lower than the average intensity of the second light L2 reaching the fingerprint sensor FPS in the central area CR. Accordingly, a relatively small amount of the reflected second light L2 may reach the peripheral area SR. The fingerprint sensor FPS in the peripheral area SR may include the user's fingerprint information, but may include relatively less information than the fingerprint sensor FPS in the central area CR.

The display device 10 may adjust the ratio of a fingerprint distance OD and a sensor distance ID to sense the light reflected by the user's finger F through the fingerprint sensor FPS. Here, the fingerprint distance OD may correspond to a distance between the surface of the cover window CW, the surface thereof being in direct contact with the user's finger F, and the center point of the hole H of the light blocking layer PHL. The sensor distance ID may correspond to a distance between the center point of the hole H of the light blocking layer PHL and the fingerprint sensor FPS of the fingerprint sensing layer FPSL. For example, light reflected from one end of the fingerprint pixel FPP on the cover window CW may pass through the center point of the hole H to reach the other end of the fingerprint sensor FPS. Further, light reflected from the other end of the fingerprint pixel FPP on the cover window CW may pass through the center point of the hole H to reach one end of the fingerprint sensor FPS. Accordingly, the shape of a fingerprint directly contacting the fingerprint pixel FPP and an image formed on the fingerprint sensor FPS may have a 180° opposite shape. The sensor driver 500 may invert the image formed on the fingerprint sensor FPS to generate a fingerprint image. The display device 500 may adjust the ratio of the fingerprint distance OD and the sensor distance ID, and may adjust the arrangement and shape of the holes in the light blocking layer PHL, thereby improving the sensitivity of the fingerprint sensor FPS.

Figure 10:
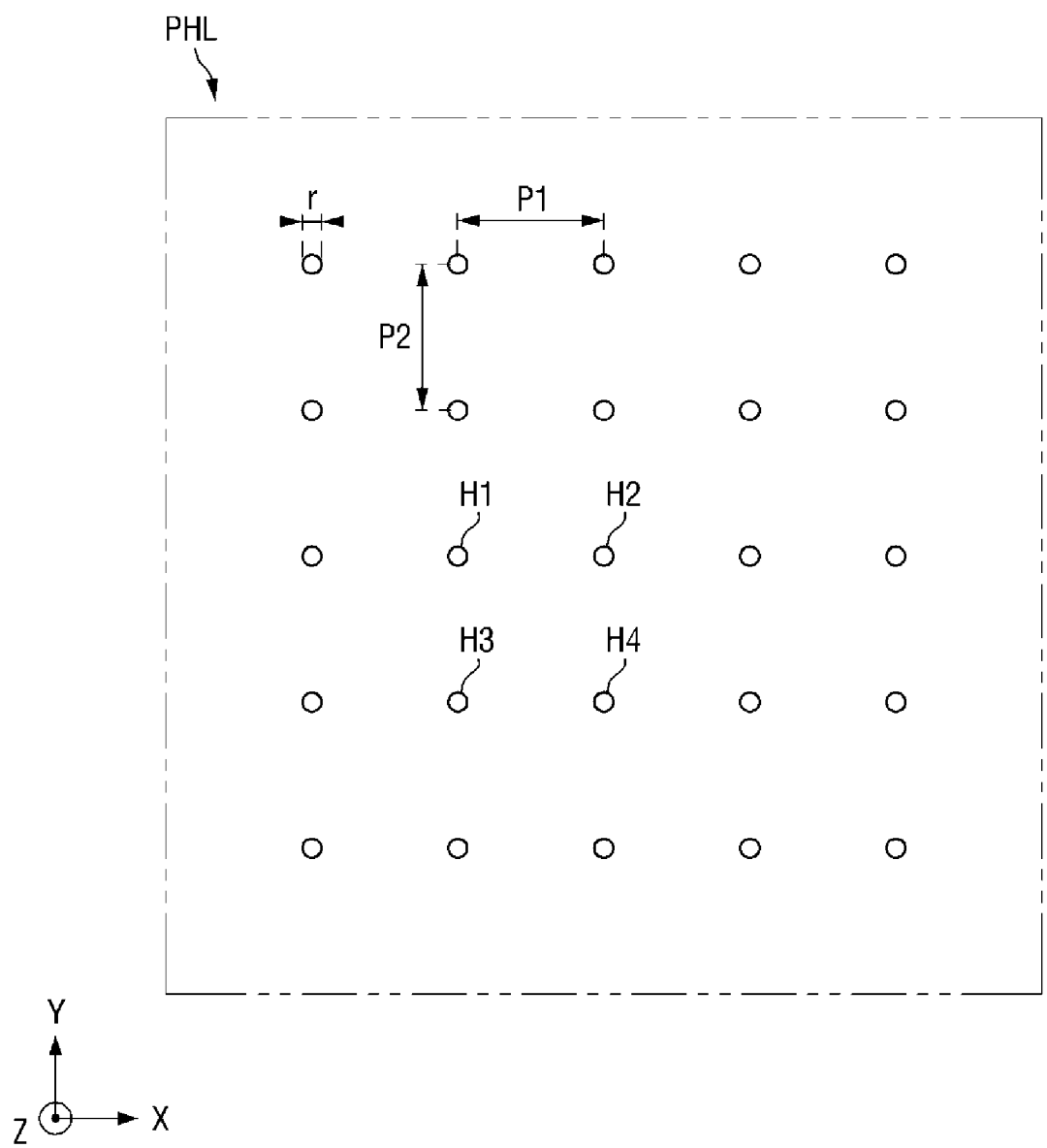
FIG. 10 is a plan view showing a light blocking layer of a display device according to an embodiment.

FIG. 10 is a plan view showing a light blocking layer of a display device according to an embodiment.

Referring to FIG. 10, the light blocking layer PHL may include a plurality of holes H. For example, the planar shape of each of the plurality of holes H may correspond to a circle. The diameter r of each of the plurality of holes H may be 3 μm to 20 μm, but is not necessarily limited thereto.

The plurality of holes H may be arranged to have a first pitch P1 in the first direction (X-axis direction). For example, the first pitch P1 may be 1.3 to 1.5 times the sensor distance ID, and preferably 1.3 times the sensor distance ID. Here, the sensor distance ID may correspond to a distance between the center point of the hole H of the light blocking layer PHL and the fingerprint sensor FPS of the fingerprint sensing layer FPSL.

The plurality of holes H may be arranged to have a second pitch P2 in the second direction (Y-axis direction). For example, the second pitch P2 may be the same as the first pitch P1. As another example, the second pitch P2 may be different from the first pitch P1.

For example, the plurality of holes H may be arranged in parallel with each other along the first direction (X-axis direction) and the second direction (Y-axis direction). As another example, the plurality of holes H may be aligned in a direction except for the first direction (X-axis direction) and the second direction (Y-axis direction) while being arranged along the first pitch P1 and the second pitch P2.

For example, the first pitch P1 or the second pitch P2 may be proportional to the thickness of the first thin film encapsulation layer TFEL1. When the thickness of the first thin film encapsulation layer TFEL1 increases, the fingerprint distance OD may increase, and the areas of the fingerprint pixel FPP and the sampling area SPR may also increase. Accordingly, the first pitch P1 or the second pitch P2 of the plurality of holes H may be proportional to the thickness of the first thin film encapsulation layer TFEL1 in order to adjust the ratio of the fingerprint distance OD and the sensor distance ID.

For example, the first pitch P1 or the second pitch P2 may be proportional to a distance between the light emitting elements of the light emitting element layer EML or a distance between the sub-pixels SP. When the distance between the light emitting elements increases, the distance between the second lights L2 reflected by the finger F may also increase. Therefore, the first pitch P1 or the second pitch P2 may be proportional to the distance between the light emitting elements or the distance between the sub-pixels SP in order for the plurality of holes H to serve as paths of the second light L2.

The light blocking layer PHL may include first to fourth holes H1, H2, H3, and H4 adjacent to each other. For example, the first to fourth holes H1, H2, H3, and H4 of the light blocking layer PHL may be arranged adjacent to each other, and the sensing areas SSR corresponding to the respective first to fourth holes H1, H2, H3, and H4 of the light blocking layer PHL may also be arranged adjacent to each other. Accordingly, the second light L2 reflected by the user's finger F may pass through the first to fourth holes H1, H2, H3, and H4 to intensively reach the sensing areas SSR adjacent to each other.

The shape of the plurality of holes H is not limited to the circular shape shown in FIG. 5. For example, the plurality of holes H may be formed in various shapes such as an elliptic shape and a polygonal shape. As another example, the plurality of holes H may have different shapes in the light blocking layer PHL.

Figure 11:
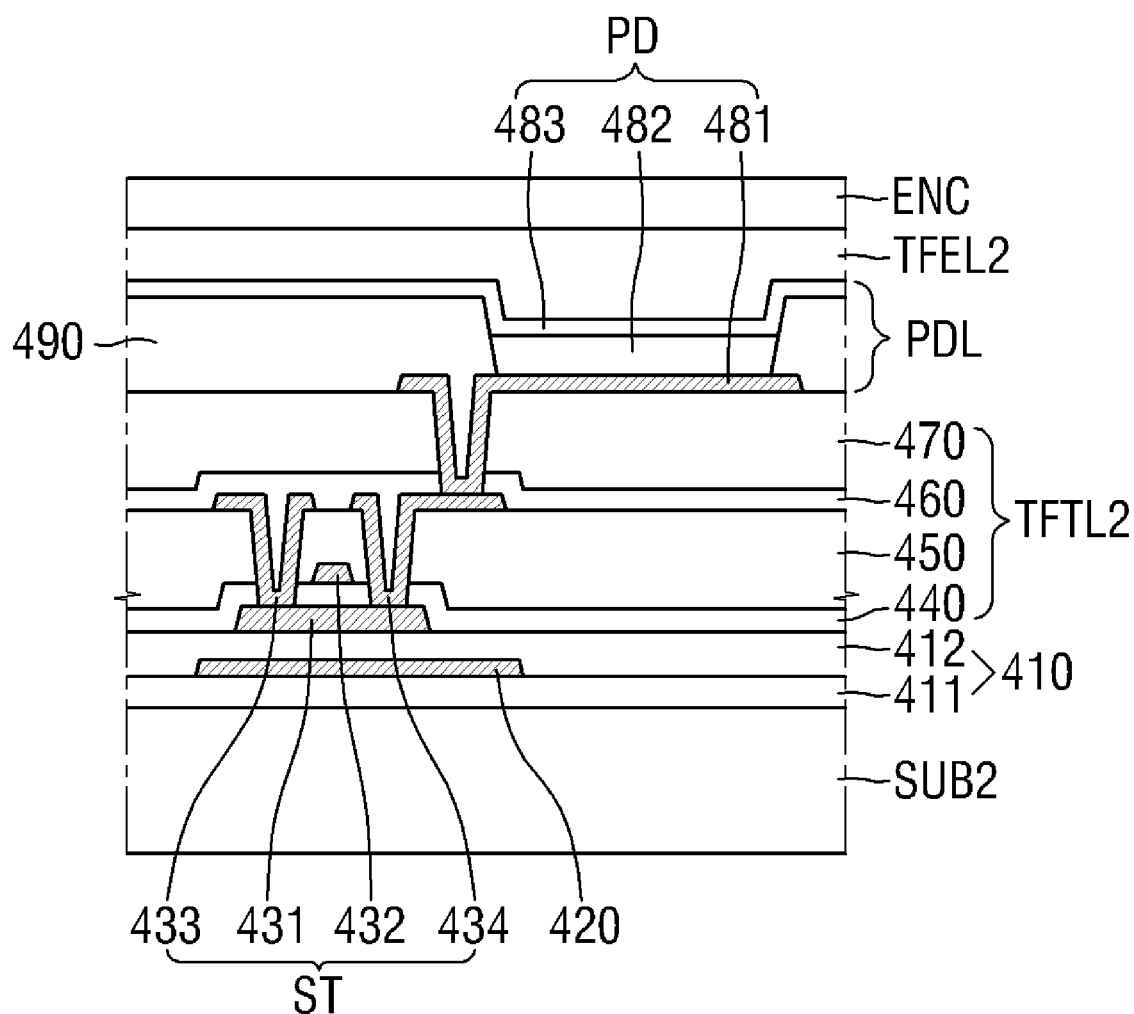
FIG. 11 is a cross-sectional view showing a fingerprint sensing layer of a display device according to an embodiment.

FIG. 11 is a cross-sectional view showing a fingerprint sensing layer of a display device according to an embodiment. For example, the encapsulation substrate ENC of the fingerprint sensing layer FPSL shown in FIG. 11 may be attached to the lower surface of the display panel 100. As another example, the fingerprint sensing layer FPSL may be inverted up and down, and thus the second substrate SUB2 of the fingerprint sensing layer FPSL is attached to the lower surface of the display panel 100.

Referring to FIG. 11, the fingerprint sensing layer FPSL may include a second substrate SUB2, a buffer layer 410, a second thin film transistor layer TFTL2, a light receiving element layer PDL, and a second thin film encapsulation layer TFEL2.

The second substrate SUB2 may be a base substrate, and may include an insulating material such as a polymer resin. For example, the second substrate SUB2 may be a rigid substrate. As another example, the second substrate SUB2 may be a flexible substrate capable of bending, folding, rolling, or the like. When the second substrate SUB2 is a flexible substrate, the second substrate SUB2 may be formed of polyimide PI, but the material thereof is not necessarily limited thereto.

The buffer layer 410 may include a first buffer layer 411 and a second buffer layer 412. The first buffer layer 411 may be provided on the second substrate SUB2. The first buffer layer 411 may be formed of an inorganic layer capable of preventing the penetration of air or moisture. The first buffer layer 411 may be formed of at least one inorganic layer of a silicon nitride layer, a silicon oxy nitride layer, a silicon oxide layer, a titanium oxide layer, and an aluminum oxide layer, but the present invention is not limited thereto.

The second buffer layer 412 may be disposed on the first buffer layer 411 to cover a light blocking pattern 420 formed on the first buffer layer 411. The second buffer layer 412 may be formed of an inorganic layer capable of preventing the penetration of air or moisture. For example, the second buffer layer 412 may improve prevention of the moisture permeation into the fingerprint sensing layer FPSL together with the first buffer layer 411.

The light blocking pattern 420 may be disposed between the first and second buffer layers 411 and 412 to overlap the switching transistor ST. For example, the light blocking pattern 420 may be formed by depositing a light absorbing material on the first buffer layer 411 and then performing exposure patterning. The light blocking pattern 420 may be made of a metal such as molybdenum (Mo), aluminum (Al), chromium (Cr), or silver (Ag), or an alloy thereof, but the material thereof is not necessarily limited thereto.

The second thin film transistor layer TFTL2 may be provided on the buffer layer 410. The second thin film transistor layer TFTL2 may include a switching transistor ST for driving each of the plurality of fingerprint sensors FPS. The second thin film transistor layer TFTL2 may further include a gate insulating film 440, an interlayer insulating film 450, a protective layer 460, and a planarization layer 470. The switching transistor ST of the fingerprint sensor FPS may include a semiconductor layer 431, a gate electrode 432, a source electrode 433, and a drain electrode 434.

The semiconductor layer 431 may be provided on the buffer layer 410. The semiconductor layer 431 may be disposed to overlap the gate electrode 432, the source electrode 433, and the drain electrode 434. The semiconductor layer 431 may be in direct contact with the source electrode 433 and the drain electrode 434, and may face the gate electrode 432 with the gate insulating film 440 therebetween.

The gate electrode 432 may be disposed on the gate insulating film 440. The gate electrode 432 may overlap the semiconductor layer 431 with the gate insulating film 440 therebetween.

The source electrode 433 and the drain electrode 434 may be spaced apart from each other on the interlayer insulating film 450. The source electrode 433 may be in contact with one end of the semiconductor layer 431 through a first contact hole provided in the gate insulating film 440 and the interlayer insulating film 450. The drain electrode 434 may be in contact with the other end of the semiconductor layer 431 through a second contact hole provided in the gate insulating film 440 and the interlayer insulating film 450. The drain electrode 434 may be in direct contact with the first electrode 481 of the light receiving element PD through a third contact hole of the protective layer 460.

The gate insulating film 440 may be provided on the semiconductor layer 431. For example, the gate insulating film 440 may be disposed on the semiconductor layer 431 and the buffer layer 410, and may insulate the semiconductor layer 431 from the gate electrode 432. The gate insulating film 440 may be formed together with a first contact hole through which the source electrode 433 penetrates and a second contact hole through which the drain electrode 434 penetrates.

The interlayer insulating film 450 may be disposed on the gate electrode 432. For example, the interlayer insulating film 450 may include a first contact hole through which the source electrode 433 penetrates and a second contact hole through which the drain electrode 434 penetrates. Here, each of the first contact hole and the second contact hole of the interlayer insulating film 450 may be connected to each of the first contact hole and the second contact hole of the gate insulating film 440.

The protection layer 460 may be provided on the switching transistor ST to protect the switching transistor ST. For example, the protective layer 460 may include a third contact hole through which the first electrode 481 of the light receiving device PD penetrates.

The planarization layer 470 may be provided on the passivation layer 460 to planarize the upper end of the switching transistor ST. For example, the planarization layer 470 may include a third contact hole through which the first electrode 481 of the light receiving element PD penetrates. Here, the third contact hole of the protective layer 460 and the third contact hole of the planarization layer 470 may be connected to each other so as to penetrate through the first electrode 481 of the light receiving element PD.

The light receiving element layer PDL may be provided on the second thin film transistor layer TFTL2. The light receiving element layer PDL may include a light receiving element PD connected to the switching transistor ST of the second thin film transistor layer TFTL2. The light receiving element PD may be disposed not to overlap the light blocking pattern 420.

The light receiving element PD may include a first electrode 481, a light receiving layer 482, and a second electrode 483.

The first electrode 481 may be provided on the planarization layer 470. For example, the first electrode 481 may be disposed to overlap an opening region of the light receiving element layer PDL defined by a sensor defining film 490. The first electrode 481 may be in contact with the drain electrode 434 of the switching transistor ST through the third contact hole provided in the planarization layer 470 and the protective layer 460. For example, the first electrode 481 may be made of a transparent conductive material to transmit the second light L2 reflected by the finger F, and may serve as an anode of the light receiving element PD.

The light receiving layer 482 may be provided on the first electrode 481. The light receiving layer 482 may include a hole injection layer, a hole transport layer, a light receiving layer, an electron blocking layer, an electron transport layer, and an electron injection layer. For example, the light receiving layer 482 may be an organic light receiving layer made of an organic material, but is not necessarily limited thereto. When the light receiving layer 482 corresponds to an organic light receiving layer, the organic light receiving layer may receive the second light L2 to combine holes and electrons, and may convert the energy of the second light L2 into an electrical signal (current or voltage) formed between the first electrode 481 and the second electrode 483.

The second electrode 483 may be provided on the light receiving layer 482. For example, the second electrode 483 may be implemented in the form of an electrode that is not divided for each fingerprint sensor FPS but is common to all the fingerprint sensors FPS. When a driving voltage is applied to the first electrode 481 and a common voltage is applied to the second electrode 483, the holes and the electrons may move to the light receiving layer 482 to be combined with each other. The second electrode 483 may serve as a cathode of the light receiving element PD.

The light receiving element layer PDL may include a sensor defining film 490 defining a plurality of fingerprint sensors FPS. The sensor defining film 490 may be provided on the planarization layer 470. The sensor defining film 490 may be provided between the first electrodes 481 adjacent to each other, and may partition the plurality of first electrodes 481. The sensor defining film 490 may define an opening region of the light receiving element layer PDL by electrically insulating the first electrode 481 and the light receiving layer 482 adjacent to each other.

The second thin film encapsulation layer TFEL2 may be provided on the light receiving element layer PDL. The second thin film encapsulation layer TFEL2 may cover the light receiving element layer PDL, and may prevent oxygen or moisture from penetrating into the light receiving element layer PDL. For example, the second thin film encapsulation layer TFEL2 may include at least one inorganic layer. The second thin film encapsulation layer TFEL2 may include an inorganic layer such as a silicon nitride layer, a silicon oxy nitride layer, a silicon oxide layer, a titanium oxide layer, or an aluminum oxide layer, but the present invention is not limited thereto.

The second thin film encapsulation layer TFEL2 may protect the light receiving element layer PDL from foreign matter such as dust. For example, the second thin film encapsulation layer TFEL2 may include at least one organic layer. The second thin film encapsulation layer TFEL2 may include an organic layer including an acrylic resin, an epoxy resin, a phenolic resin, a polyamide resin, or polyimide resin, but the present invention is not limited thereto.

The fingerprint sensing layer FPSL may further include an encapsulation substrate ENC disposed on the second thin film encapsulation layer TFEL2. The encapsulation substrate ENC may cover the second thin film encapsulation layer TFEL2 to prevent air or moisture from penetrating the fingerprint sensing layer FPSL. For example, the encapsulation substrate ENC may be a light transmitting substrate such as a glass substrate. As shown in FIG. 11, the encapsulation substrate ENC may be disposed at the uppermost portion of the fingerprint sensing layer FPSL, but is not limited thereto. For example, the encapsulation substrate ENC may be omitted.

Figure 12:
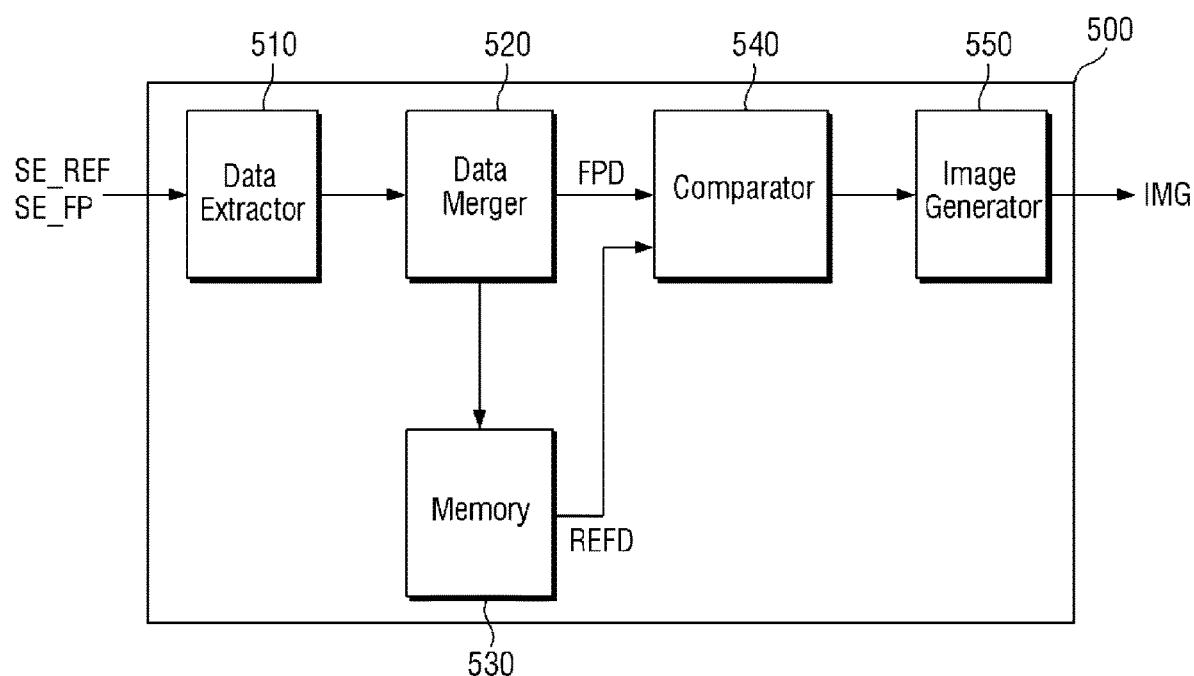
FIG. 12 is a block diagram showing a sensor driver of a display device according to an embodiment.
Figure 13:
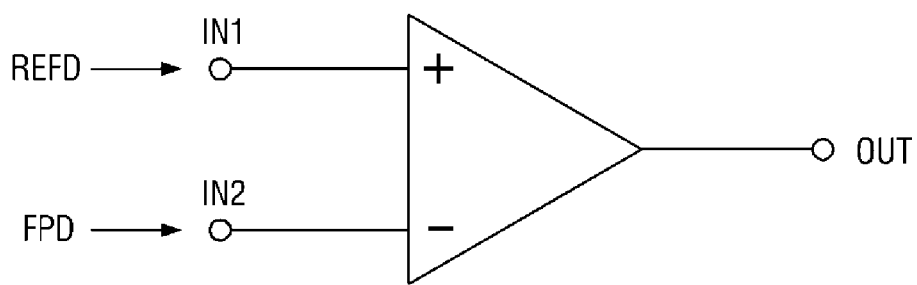
FIG. 13 is a diagram showing a comparator of the sensor driver of FIG. 12.

FIG. 12 is a block diagram showing a sensor driver of a display device according to an embodiment, and FIG. 13 is a diagram showing a comparator of the sensor driver of FIG. 12.

Referring to FIGS. 12 and 13, the sensor driver 500 may include a data extractor 510, a data merger 520, a memory 530, a comparator 540, and an image generator 550.

The data extractor 510 may receive sensing signals SE_REF and SE_FP from the plurality of fingerprint sensors FPS. The data extractor 510 may receive the sensing signals SE_REF and SE_FP from the plurality of fingerprint sensors FPS through the readout lines ROL.

The plurality of fingerprint sensors FPS may not receive light when there is no contact of a reflective material (for example, a user's body or a reference member) on the cover window CW. When the light receiving element PD of the fingerprint sensor FPS does not receive light, the light receiving element PD may output a driving current input to the first electrode to the second electrode.

When the reference member contacts the cover window CW, each of the plurality of fingerprint sensors FPS may supply the changed sensing signal SE_REF to the data extractor 510. For example, the surface of the reference member facing the fingerprint sensing layer FPSL may be flat. Therefore, the sensing signal SE_REF generated from the reflected light by the reference member may include information about characteristics of the fingerprint sensor FPS.

When the user's finger touches the cover window CW, each of the plurality of fingerprint sensors FPS may supply the changed sensing signal SE_FP to the data extractor 510.

The sensing signal SE_FP of the fingerprint sensor FPS receiving the light reflected by the ridge FR of the finger F may be different from the sensing signal SE_FP of the fingerprint sensor FPS receiving the light reflected by the valley FV of the finger F. The sensor driver 500 may recognize a difference between the sensing signals SE_FP to determine whether the ridge FR of the finger F touches the fingerprint pixel of the cover window CW corresponding to the fingerprint sensor FPS or whether the valley FV of the finger F touches the fingerprint pixel of the cover window CW. Accordingly, the sensor driver 500 may generate a fingerprint image based on the sensing signal SE_FP to recognize a pattern of the user's fingerprint.

The data extractor 510 may extract important data from the sensing signals SE_REF and SE_FP. For example, one fingerprint pixel FPP on the cover window CW may correspond to one hole H of the light blocking layer PHL, and may correspond to one sensing area SSR of the fingerprint sensing layer FPSL. One sensing area SSR may include a plurality of fingerprint sensors FPS. Data of the sensing signals SE_REF and SE_FP may be concentrated in the plurality of sensing areas SSRs. Data of the sensing signals SE_REF and SE_FP may be more concentrated in the central area CR than in the peripheral area SR. The data extractor 510 may extract data of the plurality of sensing areas SSR corresponding to the respective holes H and supply the extracted data to the data merger 520.

The data merger 520 may merge the data of the plurality of sensing areas SSR to generate reference data FREF or fingerprint data FPD. The data extractor 510 may remove unnecessary data or non-important information from the data of the sensing signals SE_REF and SE_FP, and the data merger 520 may merge necessary data or important information among the data of the sensing signals SE_REF and SE_FP.

When the reference member is in contact with the cover window CW, the data extractor 510 may receive the sensing signal SE_REF corresponding to the reference member, extract data of the sensing areas SSR from the sensing signal SE_REF, and supply the extracted data to the data merger 520. The data merger 520 may merge the data of the sensing areas SSR from the sensing signal SE_REF corresponding to the reference member to generate reference data REREF. The generated reference data REFD may be supplied to the memory 530, and may be stored in the memory 530 until the fingerprint data FPD is generated.

When the user's finger F touches the cover window CW, the data extractor 510 may receive the sensing signal SE_FP corresponding to the user's fingerprint, extract the data of the sensing areas SSR from the sensing signal SE_FP, and supply the extracted data to the data merger 520. The data merger 520 may merge the data of the sensing areas SSR from the sensing signal SE_FP corresponding to the user's fingerprint to generate a fingerprint data FPD. The data merger 520 may supply the fingerprint data FPD to the comparator 540.

The memory unit 530 may store the reference data REFD generated using the reference member before a user's touch occurs. The memory 530 may supply the stored reference data REFD to the comparator 540 when the user's touch occurs.

When the user's touch occurs, the comparator 540 may receive the reference data REFD from the memory 530, and may receive the fingerprint data FPD from the data merger 520. The comparator 540 may output a difference value between the reference data REFD and the fingerprint data FPD and supply the difference value to the image generator 550.

In FIG. 13, the comparator 540 may include a first input terminal IN1, a second input terminal IN2, and an output terminal OUT. The first input terminal IN1 of the comparator 540 may be connected to the memory unit 530, the second input terminal IN2 thereof may be connected to the data merger 520, and the output terminal OUT thereof may be connected to the image generator 550. Accordingly, the comparator 540 may supply a difference value between the reference data RFED received from the memory 530 and the fingerprint data FPD received from the data merger 520 to the image generator 550.

The image generator 550 may receive the output of the comparator 540 to generate a fingerprint image IMG. The image generator 550 may generate the fingerprint image IMG using image information (or optical information and fingerprint information) of the output of the comparator 540. For example, the image generator 550 may generate the fingerprint image IMG from the output of the comparator 540 by inversely using or calculating optical characteristics for calculating data values of the sensing signal SE_FP from an image of a reflective material (for example, a user's body).

Figure 14:
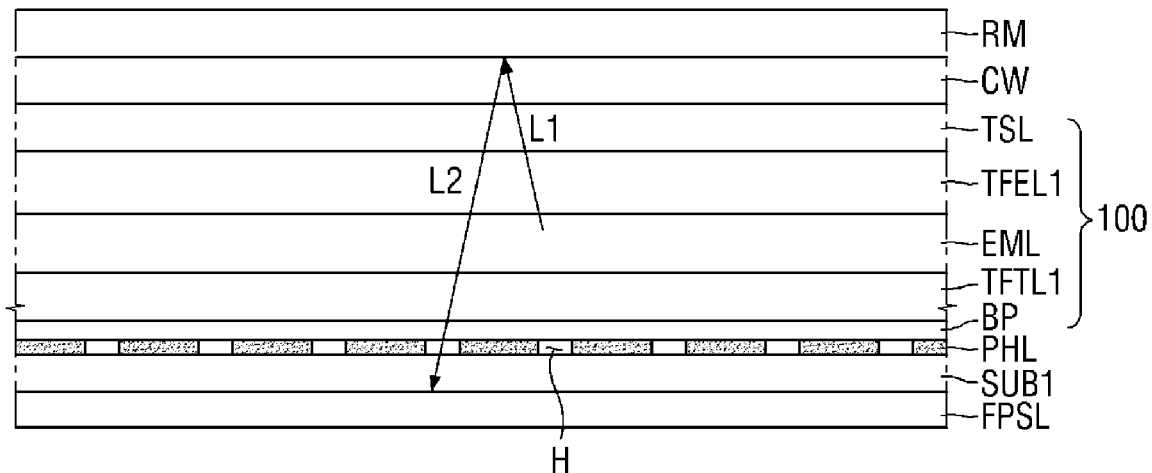
FIG. 14 is a view showing an arrangement of reference members for generating reference data in an display device according to an embodiment.
Figure 14:
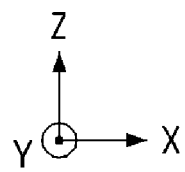

FIG. 14 is a view showing an arrangement of reference members for generating reference data in a display device according to an embodiment. In the display device shown in FIG. 14, the reference member RM is in contact with the surface of the cover window CW, and in the display device shown in FIG. 2, the finger F is in contact with the surface of the cover window CW, so that the same configuration as the aforementioned configuration will be briefly described or omitted.

Referring to FIG. 14, the reference member RM may be disposed on the cover window CW. The reference member RM may be temporarily disposed on the cover window CW to generate a reference data REREF before a user's touch occurs. The reference member RM may be removed after the reference data REFD may be generated and stored in the memory 530, and the surface of the cover window CW may be exposed to be in contact with the user's finger F.

For example, the reference member RM may be made of silicon or paper, but the material thereof is not necessarily limited thereto. The reference member RM may transmit and reflect light. For example, the reference member RM may transmit a part of the first light L1, and may reflect the other part of the first light L1 to generate second light L2 and supply the second light L2 to the fingerprint sensing layer FPSL. The surface of the reference member RM facing the fingerprint sensing layer FPSL may be flat. Therefore, the sensing signal SE_REF generated from the reflected light L2 by the reference member RM may include information about characteristic of the fingerprint sensor FPS.

Figure 15:
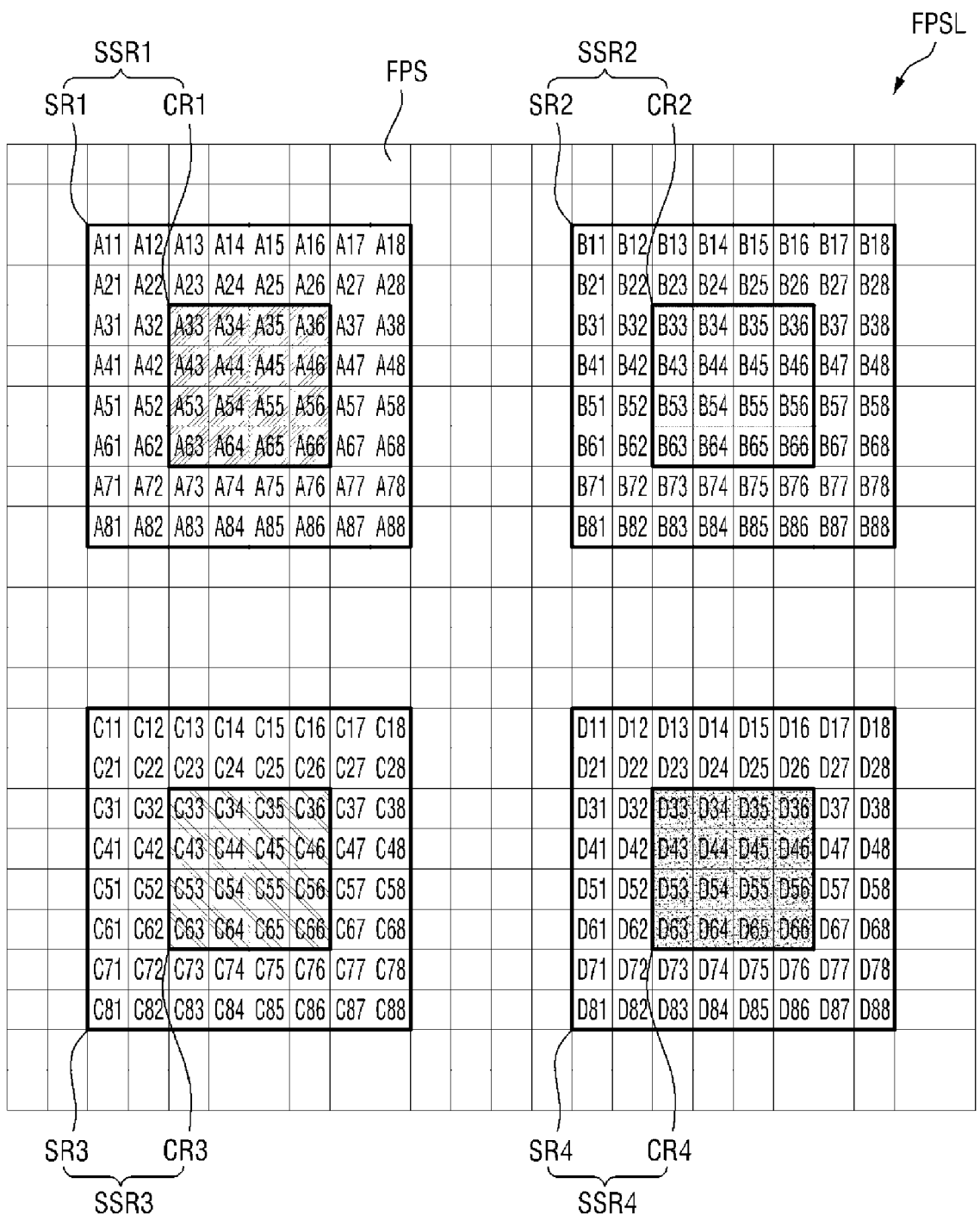
FIG. 15 is a diagram illustrating a fingerprint sensing layer receiving reflected light in a display device according to an embodiment.
Figure 16:
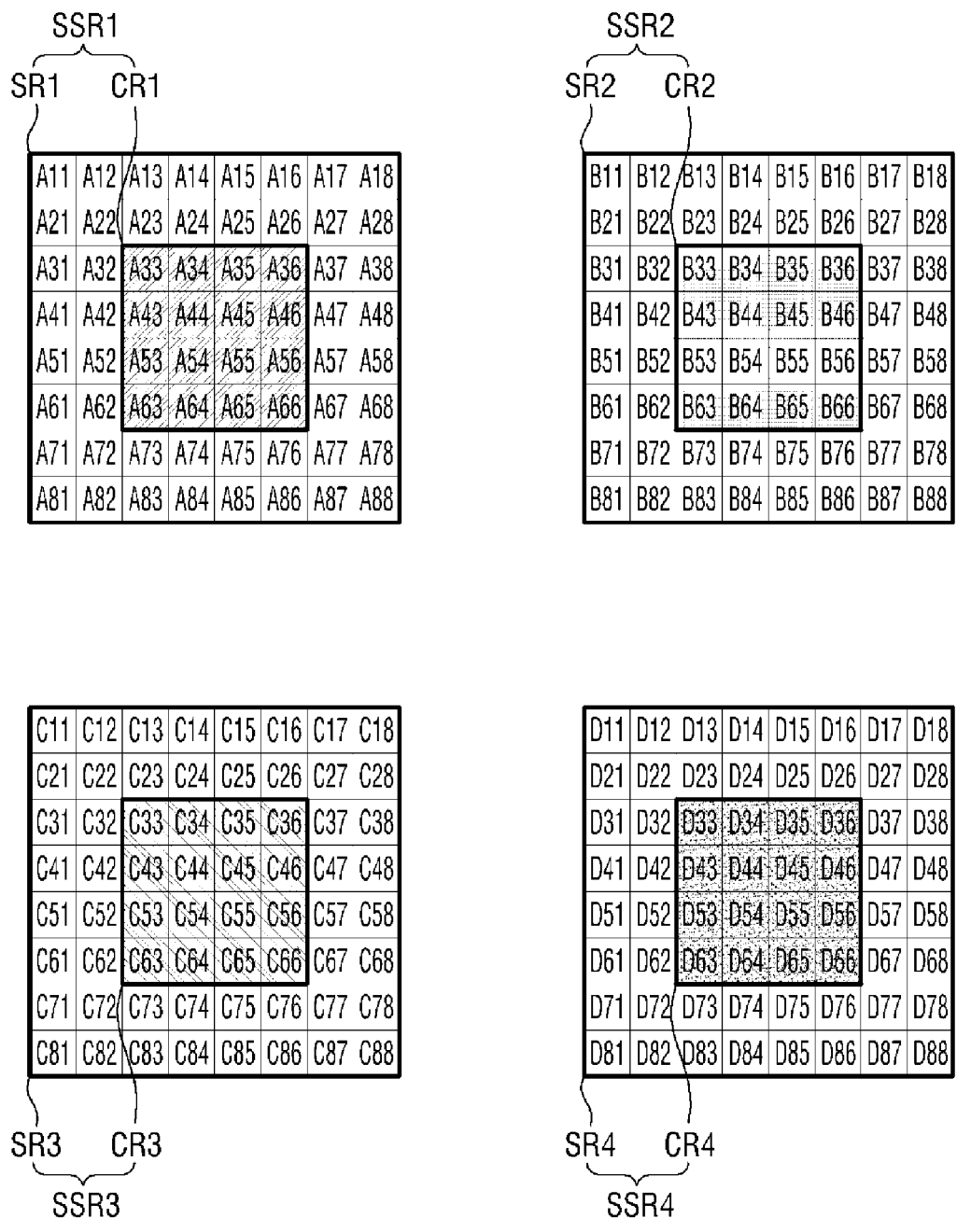

FIG. 15 is a diagram illustrating a fingerprint sensing layer receiving reflected light in a display device according to an embodiment, FIG. 16 is a diagram illustrating a plurality of sensing areas extracted from the fingerprint sensing layer of FIG. 15, and FIG. 17 is a diagram illustrating fingerprint data or reference data generated from data of the plurality of sensing areas of FIG. 16.

Referring to FIGS. 15 to 17, the fingerprint sensing layer FPSL may include a plurality of fingerprint sensors FPS, and the plurality of fingerprint sensors FPS may receive reflected light to generate sensing signals SE_REF and SE_FP. The data extractor 510 may receive the sensing signals SE_REF and SE_FP from the plurality of fingerprint sensors FPS through the readout lines ROL.

When the reference member RM is in contact on the cover window CW, the data extractor 510 may receive the sensing signal SE_REF corresponding to the reference member RM, extract data of the sensing areas SSR from the sensing signal SE_REF, and supply the extracted data to the data merger 520. The data merger 520 may merge data of the sensing areas SSR from the sensing signal SE_REF corresponding to the reference member RM to generate reference data REFD. The generated reference data REFD may be supplied to the memory 530, and may be stored in the memory 530 until a fingerprint data FPD is generated.

When a user's finger F touches the cover window CW, the data extractor 510 may receive the sensing signal SE_FP corresponding to the user's fingerprint, extract data of the sensing areas SSR from the sensing signal SE_FP, and supply the extracted data to the data merger 520. The data merger 520 may merge the data of the sensing areas SSR from the sensing signal SE_FP corresponding to the user's fingerprint to generate a fingerprint data FPD. The data merger 520 may supply the fingerprint data FPD to the comparator 540.

For example, when the reference member is in contact with the cover window CW and when the user's finger F is in contact with the cover window CW, the method of extracting data using the data extractor 510 may be the same as the method of merging data using the data merger 520. However, the data extractor 510 and the data merger 520 may receive the sensing signal SE_REF corresponding to the reference member RM to generate the reference data REFD, and may receive the sensing signal SE_FP corresponding to the user's fingerprint to generate the fingerprint data FPD. Hereinafter, a process of generating the fingerprint data FPD will be described, and a process of generating the reference data REFD will be briefly described or omitted.

Referring to FIG. 15 together with FIGS. 8 and 10, the light blocking layer PHL may include first to fourth holes H1, H2, H3, and H4, and the fingerprint sensing layer FPSL may include first to fourth sensing areas SSR1, SSR2, SSR3, and SSR4. Each of the first to fourth sensing areas SSR1, SSR2, SSR3, and SSR4 of the fingerprint sensing layer FPSL may correspond to the each of first to fourth holes H1, H2, H3, and H4 of the light blocking layer PHL. Accordingly, the second light L2 reflected by the user's finger F may pass through the first to fourth holes H1, H2, H3, and H4, and reach the first to fourth sensing areas SSR1, SSR2, SSR3, and SSR4 intensively.

Each of the first to fourth sensing areas SSR1, SSR2, SSR3, and SSR4 may include each of first to fourth central areas CR1, CR2, CR3, and CR4 and each of first to fourth peripheral areas SR1, SR2, SR3, and SR4.

For example, the first sensing area SSR1 may include m-n fingerprint sensors Amn (hereinafter, m is a natural number of 1 to 8, and n is a natural number of 1 to 8). Among these, the first central area CR1 may include i-j fingerprint sensors Aij (hereinafter, i is a natural number of 3 to 6, and j is a natural number of 3 to 6). Further, the first peripheral area SR1 may include fingerprint sensors other than the fingerprint sensors Aij of the first central area CR1 among the fingerprint sensors Amn of the first sensing area SSR1.

The second sensing area SSR2 may include m-n fingerprint sensors Bmn. Among these, the second central area CR2 may include i-j fingerprint sensors Bij. Further, the second peripheral area SR2 may include fingerprint sensors other than the fingerprint sensors Bij of the second central area CR2 among the fingerprint sensors Bmn of the second sensing area SSR2.

In this way, the third and fourth sensing areas SSR3 and SSR4 may also include a plurality of fingerprint sensors Cmn and Dmn. Hereinafter, common descriptions of the first to fourth sensing areas SSR1, SSR2, SSR3, and SSR4 will be omitted.

The first central area CR1 may be disposed at the center of the first sensing area SSR1. The reflected light passing through the first hole H1 may intensively reach the first central area CR1. Therefore, the plurality of fingerprint sensors Aij of the first central area CR1 may have intensive user' fingerprint information.

The first peripheral area SR1 may surround the first central area CR1. For example, the average intensity of the second light L2 reaching the fingerprint sensors Amn (excluding the fingerprint sensors Aij) in the first peripheral area SR1 may be lower than the average intensity of the second light L2 reaching the fingerprint sensors Aij in the first central area CR1. Accordingly, a relatively small amount of reflected light may reach the first peripheral area SR1 as compared with the first central area CR1. Therefore, the fingerprint sensors Amn (excluding the fingerprint sensors Aij) in the first peripheral area SR1 may have relatively less fingerprint information than the fingerprint sensors Aij in the first central area CR1.

The data extractor 510 may extract data of the plurality of fingerprint sensors FPS including user's fingerprint information from the sensing signal SE_FP. The data extractor 510 may extract data of fingerprint sensors in which reflected light passing through the holes H is concentrated, among the plurality of fingerprint sensors FPS arranged in the fingerprint sensing layer FPSL. The data extractor 510 may extract data of the each of first to fourth sensing areas SSR1, SSR2, SSR3, and SSR4 corresponding to each of the first to fourth holes H1, H2, H3, and H4 among the plurality of fingerprint sensors FPS shown in FIG. 15, and may supply the extracted data shown in FIG. 16 to the data merger 520.

The data merger 520 may merge the data shown in FIG. 16 to generate the fingerprint data FPD or reference data REREF shown in FIG. 17. For example, the data merger 520 may merge data of the peripheral area SR of each of the sensing areas SSR with data of the central area CR of another sensing area SSR adjacent to the corresponding sensing area SSR to generate the fingerprint data FPD.

The data merger 520 may merge data of the first to fourth sensing areas SSR1, SSR2, SSR3, and SSR4 to generate the fingerprint data FPD or the reference data REFD. The fingerprint data FPD or the reference data REFD may include a core merge region CMR and a peripheral merge region SMR. For example, the core merge region CMR of the fingerprint data FPD may be formed by arranging data of the first to fourth central areas CR1, CR2, CR3, and CR4 in parallel and merging data of the first to fourth peripheral areas SR1, SR2, SR3, and SR4 with data of the adjacent central area.

For example, data of the first central area CR1 of the first sensing area SSR1 may be merged with data of the second to fourth peripheral areas SR2, SR3, and SR4. The 1-3 data CM13 of the core merge region CMR may be generated by merging data of the 5-3 fingerprint sensor A53 of the first central area CR1 and data of the 1-3 fingerprint sensor C13 of the third peripheral area SR3. The 3-1 data CM31 of the core merge region CMR may be generated by merging data of the 5-3 fingerprint sensor A53 of the first central area CR1 and data of the 1-3 fingerprint sensor C13 of the third peripheral area SR3. The 3-3 data CM33 of the core merge region CMR may be generated by merging data of the 5-5 fingerprint sensor A55 of the first central area CR1, data of the 5-1 fingerprint sensor B51 of the second peripheral area SR2, data of the 1-5 fingerprint sensor C15 of the third peripheral area SR3, and data of the 1-1 fingerprint sensor D11 of the fourth peripheral area SR4.

For example, data of the second central area CR2 of the second sensing area SSR2 may be merged with data of the first, third, and fourth peripheral areas SR1, SR3, and SR4. The 1-6 data CM16 of the core merge region CMR may be generated by merging data of the 3-4 fingerprint sensor B34 of the second central area CR2 and data of the 3-8 fingerprint sensor C38 of the first peripheral area SR1. The 3-8 data CM38 of the core merge region CMR may be generated by merging data of the 5-6 fingerprint sensor B56 of the second central area CR2 and data of the 1-6 fingerprint sensor C16 of the fourth peripheral area SR4. The 3-6 data CM36 of the core merge region CMR may be generated by merging data of the 5-4 fingerprint sensor B54 of the second central area CR2, data of the 5-8 fingerprint sensor A58 of the first peripheral area SR1, data of the 1-8 fingerprint sensor C18 of the third peripheral area SR3, and data of the 1-4 fingerprint sensor D14 of the fourth peripheral area SR4.

For example, data of the third central area CR3 of the third sensing area SSR3 may be merged with data of the first, second, and fourth peripheral areas SR1, SR2, and SR4. The 6-1 data CM61 of the core merge region CMR may be generated by merging data of the 4-3 fingerprint sensor C43 of the third central area CR3 and data of the 8-3 fingerprint sensor A83 of the first peripheral area SR1. The 8-3 data CM83 of the core merge region CMR may be generated by merging data of the 6-5 fingerprint sensor C65 of the third central area CR3 and data of the 6-1 fingerprint sensor D61 of the fourth peripheral area SR4. The 6-3 data CM63 of the core merge region CMR may be generated by merging data of the 4-5 fingerprint sensor C45 of the third central area CR3, data of the 8-5 fingerprint sensor A85 of the first peripheral area SR1, data of the 8-1 fingerprint sensor B81 of the second peripheral area SR2, and data of the 1-4 fingerprint sensor D14 of the fourth peripheral area SR4.

For example, data of the fourth central area CR4 of the fourth sensing area SSR4 may be merged with data of the first to third peripheral areas SR1, SR2, and SR3. The 6-8 data CM68 of the core merge region CMR may be generated by merging data of the 4-6 fingerprint sensor D46 of the fourth central area CR4 and data of the 8-6 fingerprint sensor B86 of the second peripheral area SR2. The 8-6 data CM86 of the core merge region CMR may be generated by merging data of the 6-4 fingerprint sensor D64 of the fourth central area CR4 and data of the 6-8 fingerprint sensor C68 of the third peripheral area SR3. The 6-6 data CM66 of the core merge region CMR may be generated by merging data of the 4-4 fingerprint sensor D44 of the fourth central area CR4, data of the 8-8 fingerprint sensor A88 of the first peripheral area SR1, data of the 8-4 fingerprint sensor B84 of the second peripheral area SR2, and data of the 4-8 fingerprint sensor C48 of the third peripheral area SR3.

The peripheral merge region SMR of the fingerprint data FPD may be generated by merging data of peripheral areas SR adjacent to each other. For example, the 1-1 data SM11 of the peripheral merge region SMR may be generated by merging data of the 1-5 fingerprint sensor A15 of the first peripheral area SR1 and data of the 1-1 fingerprint sensor B11 of the second peripheral area SR2. The 3-1 data SM31 of the peripheral merge region SMR may be generated by merging data of the 5-1 fingerprint sensor A51 of the first peripheral area SR1 and data of the 1-1 fingerprint sensor C11 of the third peripheral area SR3.

As described above, the data merger 520 may merge data of the plurality of sensing areas SSR to emphasize important information and remove non-important information among the data of the sensing signals SE_REF and SE_FP. Further, the data merger 520 may generate the reference data REFD or the fingerprint data FPD using not only data of the central area CR of the sensing areas SSR but also data of the peripheral area SR. Accordingly, the sensor driver 500 may widely use data of the central area CR and data of the peripheral area SR in the process of merging data of the plurality of fingerprint sensors FPS, thereby naturally merging data of the plurality of sensing areas SSR and acquiring high-quality fingerprint images from low-resolution fingerprint sensors.

Figure 18:
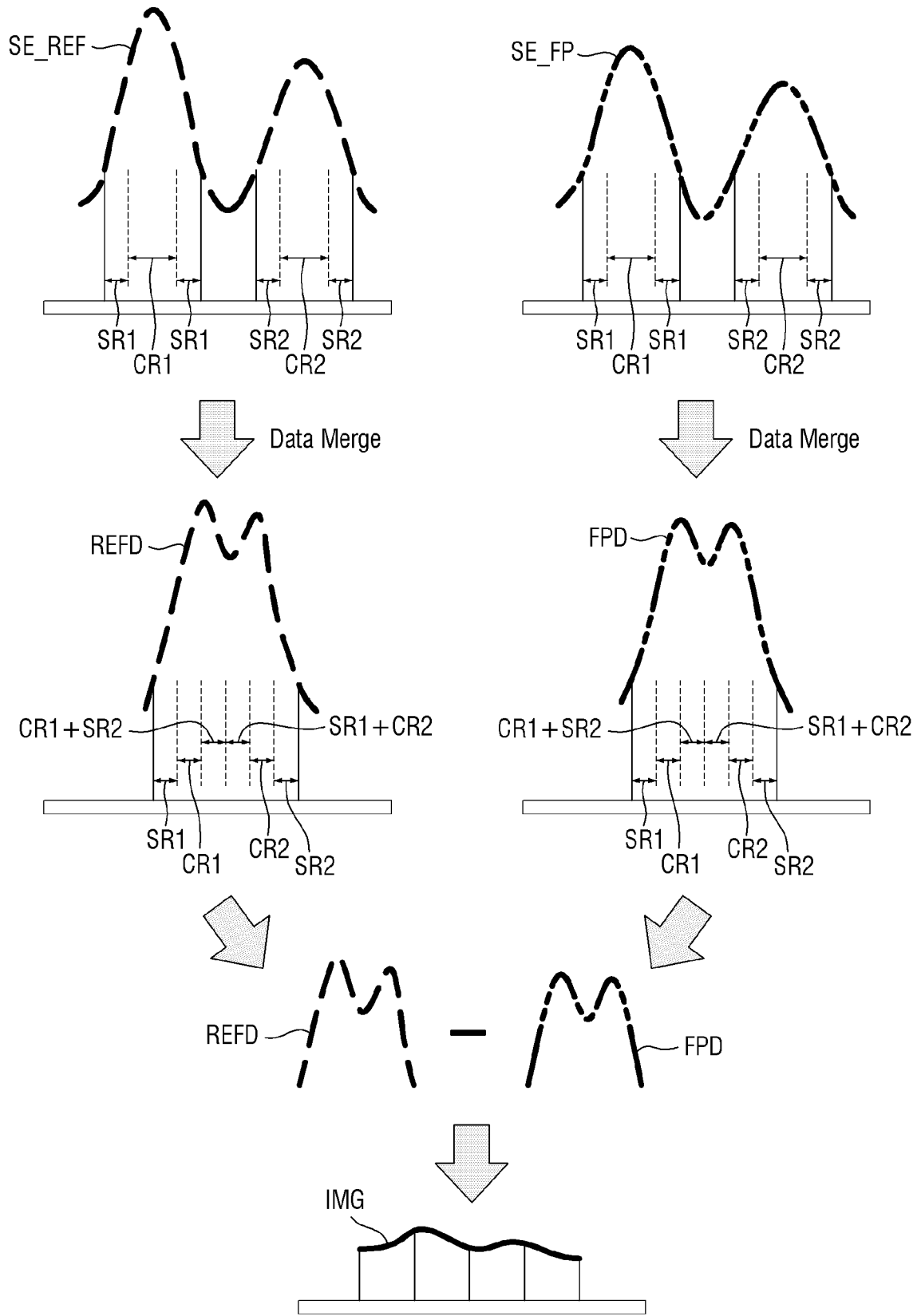
FIG. 18 is a view illustrating a process of generating a fingerprint image in a display device according to an embodiment.

FIG. 18 is a view illustrating a process of generating a fingerprint image in a display device according to an embodiment. Here, FIG. 18 shows a method of merging data of first and second sensing areas SSR1 and SSR2, but the method shown in FIG. 18 is substantially the same as the method described with reference to FIGS. 15 to 17. Therefore, the configuration shown in FIG. 18 may be used as it is in the process of merging data of four or more sensing areas SSRs.

Referring to FIG. 18, the fingerprint sensing layer FPSL may include first and second sensing areas SSR1 and SSR2, and each of the first and second sensing areas SSR1 and SSR2 may include each of first and second central areas CR1 and CR2 and each of first and second peripheral areas SR1 and SR2.

When the reference member RM is in contact with the cover window CW, the data extractor 510 may receive a sensing signal SE_REF corresponding to the reference member RM, extract data of the sensing areas SSR from the sensing signal SE_REF, and supply the extracted data to the data merger 520.

The data merger 520 may merge the data of the sensing areas SSR from the sensing signal SE_REF corresponding to the reference member RM to generate reference data REFD. The data merger 520 may merge data of the peripheral area SR of each of the sensing areas SSR with data of the central area CR of another sensing area SSR adjacent to the corresponding sensing area SSR to generate reference data REFD.

For example, the data merger 520 may receive the sensing signal SE_REF corresponding to the reference member RM, and may merge data of the first peripheral area SR1 of the first sensing area SSR1 with data of the second central area CR2 of the second sensing area SSR2 to form a merged region SR1+CR2. Further, the data merger 520 may merge data of the second peripheral area SR2 of the second sensing area SSR2 with data of the first central area CR1 of the first sensing area SSR1 to form a merged region CR1+SR2. The data merger 520 may merge data of the plurality of sensing areas SSR to generate the reference data REREF.

The memory 530 may store the reference data REFD generated using the reference member RM before a user's touch occurs. The memory 530 may supply the stored reference data REREF to the comparator 540 when the user's touch occurs.

When the user's finger F touches the cover window CW, the data extractor 510 may receive the sensing signal SE_FP corresponding to a user's fingerprint, extract data of the sensing areas SSR from the sensing signal SE_FP, and supply the extracted data to the data merger 520.

The data merger 520 may merge data of the sensing areas SSR from the sensing signal SE_FP corresponding to the user's fingerprint to generate fingerprint data FPD. The data merger 520 may merge data of the peripheral area SR of each of the sensing areas SSR with data of the central area CR of another sensing area SSR adjacent to the corresponding sensing area SSR to generate fingerprint data FPD.

For example, the data merger 520 may receive the sensing signal SE_FP corresponding to the user's fingerprint, and may merge data of the first peripheral area SR1 of the first sensing area SSR1 with data of the second central area CR2 of the second sensing area SSR2 to form a merged region SR1+CR2. Further, the data merger 520 may merge data of the second peripheral area SR2 of the second sensing area SSR2 with data of the first central area CR1 of the first sensing area SSR1 to form a merged region CR1+SR2. The data merger 520 may merge data of the plurality of sensing areas SSR to generate the fingerprint data FPD.

When a user's touch occurs, the comparator 540 may receive the reference data REFD from the memory 530 and receive the fingerprint data FPD from the data merger 520. The comparator 540 may output a difference value REFD-FPD between the reference data REFD and the fingerprint data FPD and supply the difference value REFD-FPD to the image generator 550.

The image generator 550 may receive the output of the comparator 540 to generate a fingerprint image IMG. The image generator 550 may generate the fingerprint image IMG using image information (or optical information and fingerprint information) of the output of the comparator 540. For example, the image generator 550 may generate the fingerprint image IMG from the output of the comparator 540 by inversely using or calculating optical characteristics for calculating data values of the sensing signal SE_FP from an image of a reflective material (for example, a user's body).

The sensor driver 500 may generate the fingerprint image IMG based on the difference value between the reference data REFD and the fingerprint data FPD, thereby reflecting the characteristics of the plurality of fingerprint sensors FPS to improve the quality of the fingerprint image IMG. Accordingly, the display device 10 according to the present application may obtain a high-quality fingerprint image from a low-resolution fingerprint sensor.

Figure 19:
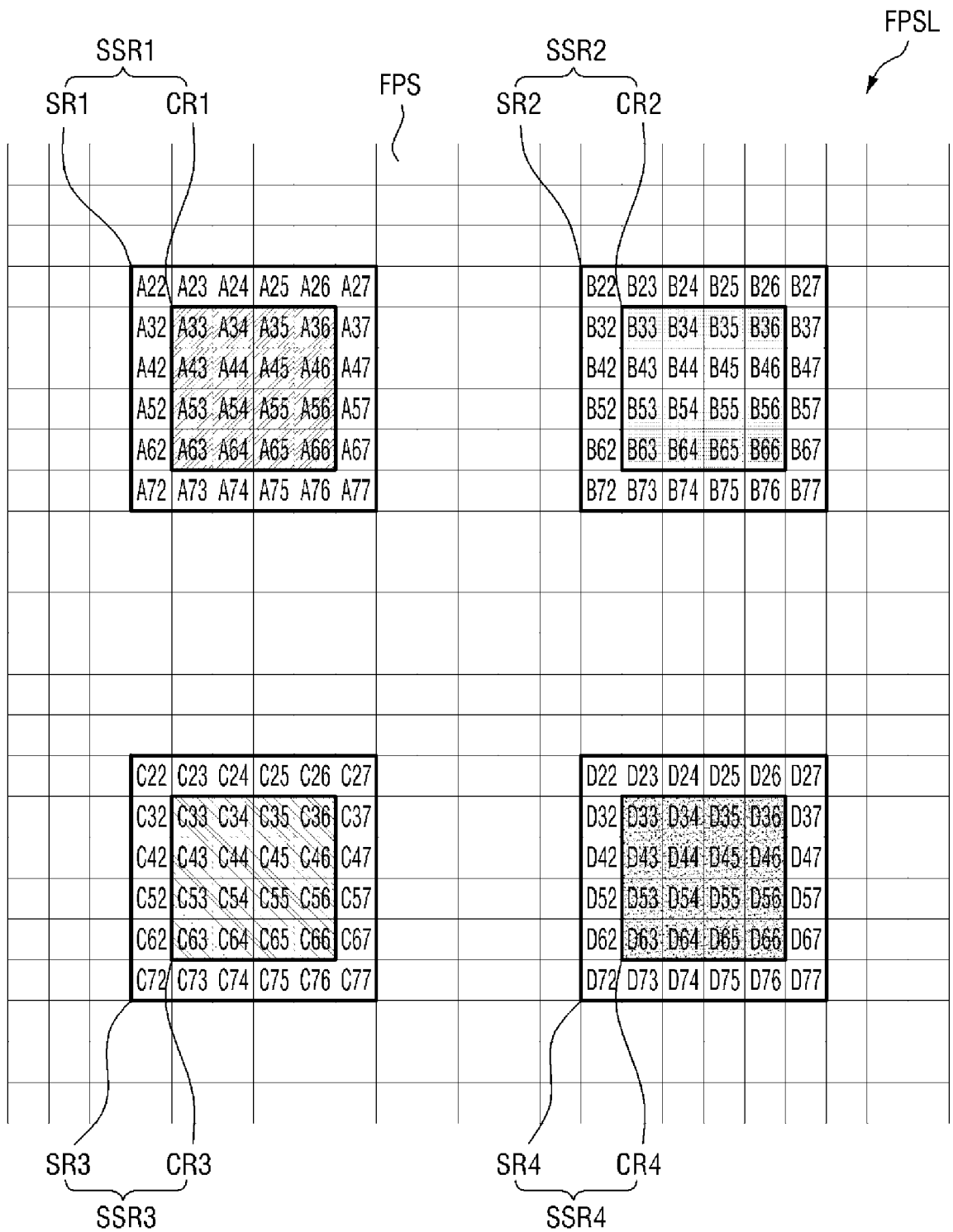
FIG. 19 is a diagram illustrating a fingerprint sensing layer receiving reflected light in a display device according to another embodiment.
Figure 20:
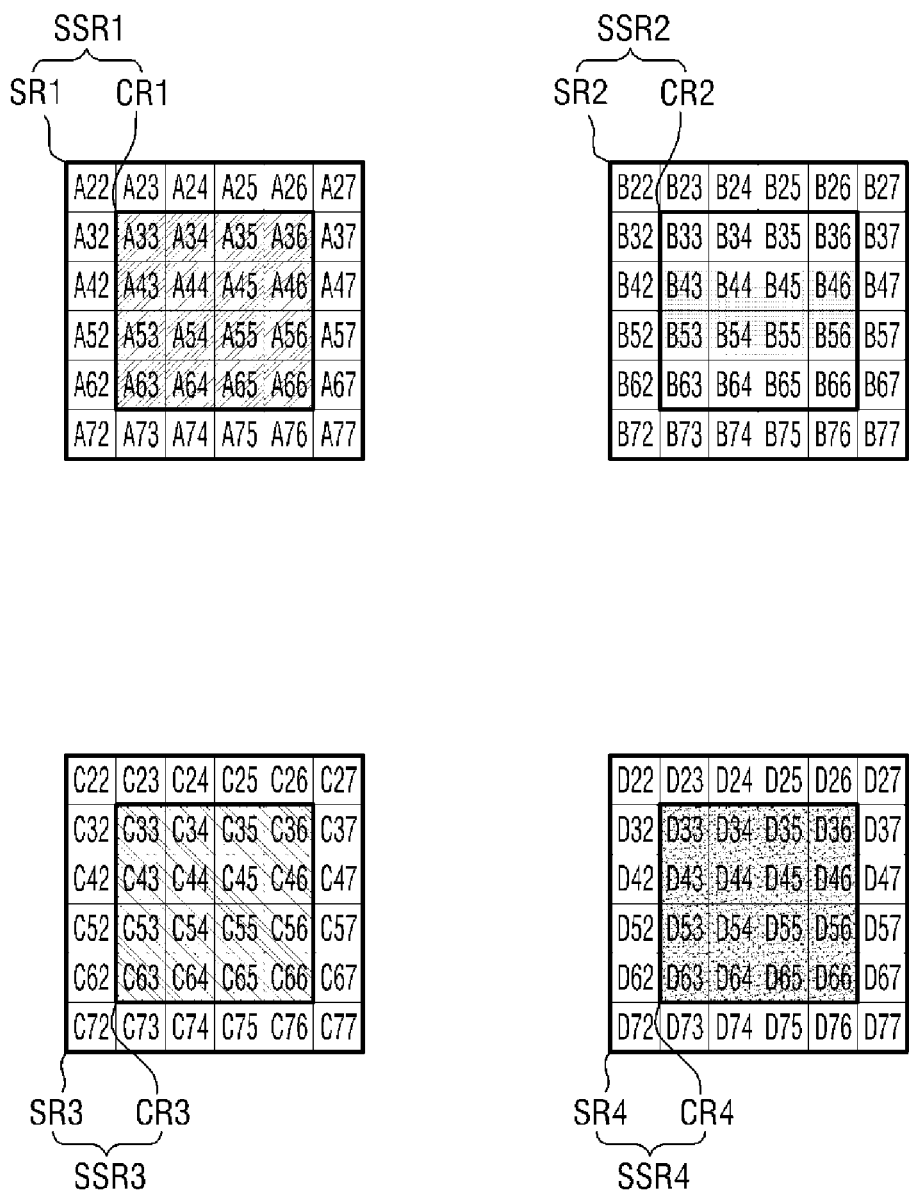
FIG. 20 is a diagram illustrating a plurality of sensing areas extracted from the fingerprint sensing layer of FIG. 19.
Figure 21:
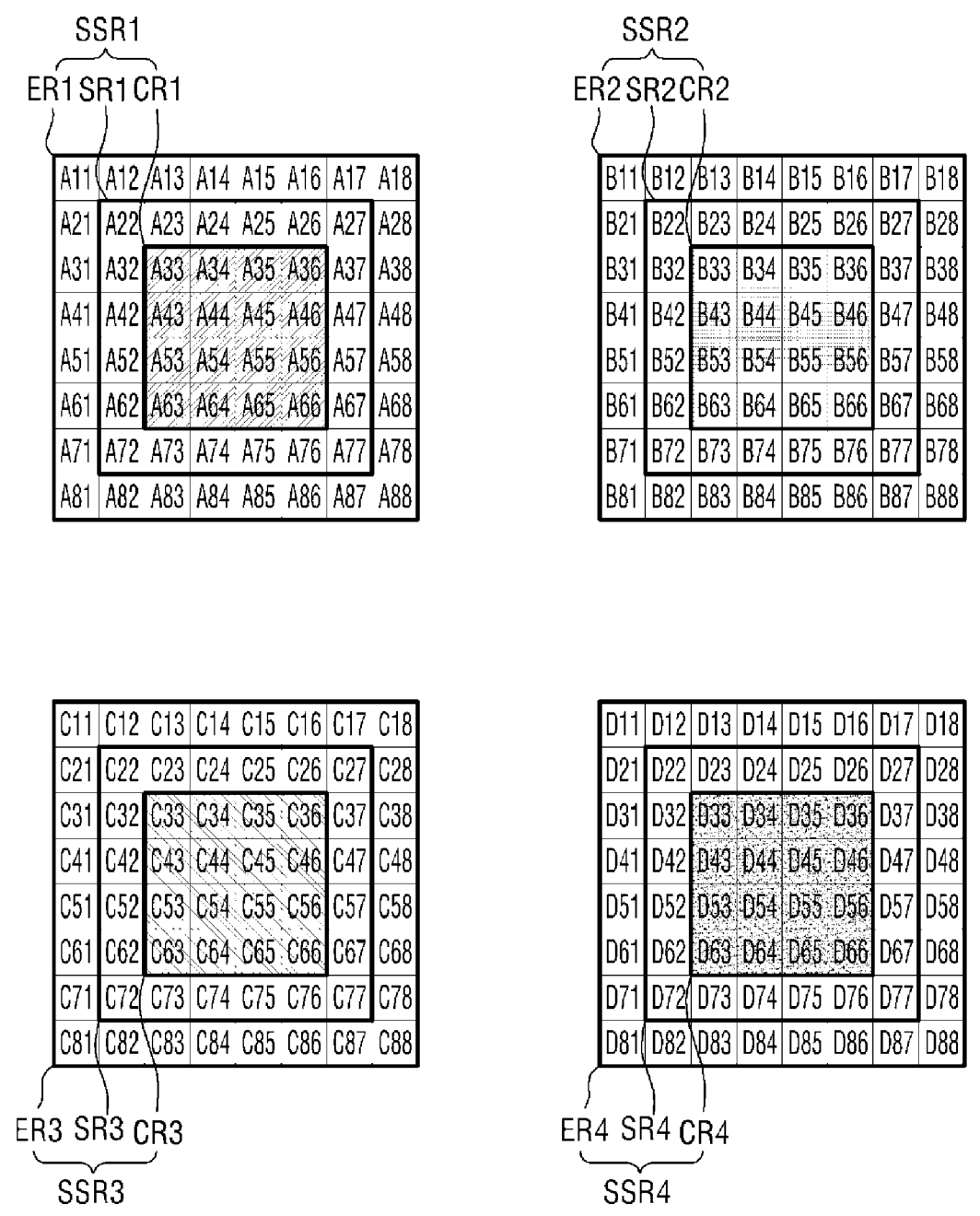

FIG. 19 is a diagram illustrating a fingerprint sensing layer receiving reflected light in a display device according to another embodiment, FIG. 20 is a diagram illustrating a plurality of sensing areas extracted from the fingerprint sensing layer of FIG. 19, FIG. 21 is a diagram illustrating an extension area generated from each of the plurality of sensing areas of FIG. 20, and FIG. 22 is a diagram illustrating fingerprint data or reference data generated from data of the plurality of sensing areas of FIG. 21. The first to fourth sensing areas SSR1, SSR2, SSR3, and SSR4 shown in FIGS. 19 to 22 may further include extension areas ER1, ER2, ER3, and ER4 extending from the first to fourth sensing areas SSR1, SSR2, SSR3, and SSR4 shown in FIGS. 15 to 17. Therefore, the same configuration as the above-described configuration will be briefly described or omitted.

Referring to FIGS. 19 to 22, the fingerprint sensing layer FPSL may include a plurality of fingerprint sensors FPS, and the plurality of fingerprint sensors FPS may receive reflected light to generate sensing signals SE_REF and SE_FP. The data extractor 510 may receive the sensing signals SE_REF and SE_FP from the plurality of fingerprint sensors FPS through the readout lines ROL.

Referring to FIG. 19 together with FIGS. 8 and 10, the light blocking layer PHL may include first to fourth holes H1, H2, H3, and H4, and the fingerprint sensing layer FPSL may include first to fourth sensing areas SSR1, SSR2, SSR3, and SSR4. Each of the first to fourth sensing areas SSR1, SSR2, SSR3, and SSR4 of the fingerprint sensing layer FPSL may correspond to each of the first to fourth holes H1, H2, H3, and H4 of the light blocking layer PHL. Accordingly, the second light L2 reflected by the user's finger F may pass through the first to fourth holes H1, H2, H3, and H4, and reach the first to fourth sensing areas SSR1, SSR2, and SSR3, and SSR4 intensively.

Each of the first to fourth sensing areas SSR1, SSR2, SSR3, and SSR4 may include each of first to fourth central areas CR1, CR2, CR3, and CR4 and first to fourth peripheral areas SR1, SR2, SR3, and SR4.

For example, the first sensing area SSR1 may include p-q fingerprint sensors Apq (hereinafter, p is a natural number of 2 to 7, and q is a natural number of 2 to 7). Among these, the first central area CR1 may include i-j fingerprint sensors Aij (hereinafter, i is a natural number of 3 to 6, and j is a natural number of 3 to 6). Further, the first peripheral area SR1 may include fingerprint sensors other than the fingerprint sensors Aij of the first central area CR1 among the fingerprint sensors Apq of the first sensing area SSR1.

The second sensing area SSR2 may include p-q fingerprint sensors Bpq. Among these, the second central area CR2 may include i-j fingerprint sensors Bij. Further, the second peripheral area SR2 may include fingerprint sensors other than the fingerprint sensors Bij of the second central area CR2 among the fingerprint sensors Bmn of the second sensing area SSR2.

In this way, the third and fourth sensing areas SSR3 and SSR4 may also include a plurality of fingerprint sensors Cpq and Dpq. Hereinafter, common descriptions of the first to fourth sensing areas SSR1, SSR2, SSR3, and SSR4 will be omitted.

The first central area CR1 may be disposed at the center of the first sensing area SSR1. The reflected light passing through the first hole H1 may intensively reach the first central area CR1. Therefore, the plurality of fingerprint sensors Aij of the first central area CR1 may have intensive user's fingerprint information.

The first peripheral area SR1 may surround the first central area CR1. For example, the average intensity of the second light L2 reaching the fingerprint sensors Apq (excluding the fingerprint sensors Aij) in the first peripheral area SR1 may be lower than the average intensity of the second light L2 reaching the fingerprint sensors Aij in the first central area CR1. Accordingly, a relatively small amount of reflected light may reach the first peripheral area SR2 as compared with the first central area CR1. Therefore, the fingerprint sensors Apq (excluding the fingerprint sensors Aij) in the first peripheral area SR1 may have relatively less fingerprint information than the fingerprint sensors Aij in the first central area CR1.

Each of the first to fourth sensing areas SSR1, SSR2, SSR3, and SSR4 may further include each of first to fourth extension areas ER1, ER2, ER3 and ER4 surrounding each of the first to fourth peripheral areas SR1, SR2, SR3, and SR4.

The data extractor 510 may generate data of the first extension area ER1 based on data of the first central area CR1 and data of the first peripheral area SR1. The data of the first extension area ER1 may be generated based on an average value of differences between data of the central area CR of each of the sensing areas SSR and data of the peripheral area SR thereof. For example, the data extractor 510 may calculate an average ratio or average profile of data of the central area CR of each of the plurality of sensing areas SSR and data of the peripheral area SR thereof, and may the average ratio or the average profile to the extension areas of all the sensing areas. Accordingly, the data extractor 510 may calculate a data value of the first extension area ER1 based on the average ratio or average profile of the plurality of sensing areas SSR.

For example, the width of the first peripheral area SR1 may be the same as the width of the first expansion region ER1, but the present invention is not necessarily limited thereto.

The data extractor 510 may extract data of the plurality of fingerprint sensors FPS including user's fingerprint information from the sensing signal SE_FP. The data extractor 510 may extract data of fingerprint sensors in which the reflected light passing through the holes H is concentrated, among the plurality of fingerprint sensors FPS arranged in the fingerprint sensing layer FPSL. The data extractor 510 may extract data of the first to fourth sensing areas SSR1, SSR2, SSR3, and SSR4 shown in FIG. 20 from the data of the plurality of fingerprint sensors FPS shown in FIG. 19, and may generate data of the first to fourth sensing areas SSR1, SSR2, SSR3, and SSR4 shown in FIG. 21 from the data of the first to fourth sensing areas SSR1, SSR2, SSR3, and SSR4 shown in FIG. 20. The data extractor 510 may supply the data of the first to fourth sensing areas SSR1, SSR2, SSR3, and SSR4 shown in FIG. 21 to the data merger 520.

The data merger 520 may merge the data shown in FIG. 21 to generate the fingerprint data FPD or reference data REREF shown in FIG. 22. For example, the data merger 520 may merge data of the peripheral area SR and extension area ER of each of the sensing areas SSR with data of the central area CR of another sensing area SSR adjacent to the corresponding sensing area SSR to generate the fingerprint data FPD.

The data merger 520 may merge data of the first to fourth sensing areas SSR1, SSR2, SSR3, and SSR4 to generate the fingerprint data FPD or the reference data REFD. The fingerprint data FPD or the reference data REFD may include a core merge region CMR and a peripheral merge region SMR. For example, the core merge region CMR of the fingerprint data FPD may be formed by arranging data of the first to fourth central areas CR1, CR2, CR3, and CR4 in parallel and merging data of the first to fourth peripheral areas SR1, SR2, SR3, and SR4 and data of the first to fourth extension areas ER1, ER2, ER3, and ER4 with data of the adjacent central area.

For example, data of the first central area CR1 of the first sensing area SSR1 may be merged with data of the second to fourth peripheral areas SR2, SR3, and SR4 and data of the first to fourth extension areas ER1, ER2, ER3, and ER4. The 1-3 data CM13 of the core merge region CMR may be generated by merging data of the 3-5 fingerprint sensor A35 of the first central area CR1 and data of the 3-1 fingerprint sensor B31 of the second extension area ER2. The 1-4 data CM14 of the core merge region CMR may be generated by merging data of the 3-6 fingerprint sensor A36 of the first central area CR1 and data of the 3-2 fingerprint sensor B32 of the second peripheral area SR2.

The 3-1 data CM31 of the core merge region CMR may be generated by merging data of the 5-3 fingerprint sensor A53 of the first central area CR1 and data of the 1-3 fingerprint sensor C13 of the third extension area ER3. The 4-1 data CM41 of the core merge region CMR may be generated by merging data of the 6-3 fingerprint sensor A63 of the first central area CR1 and data of the 2-3 fingerprint sensor C23 of the third peripheral area SR3.

The 3-3 data CM33 of the core merge region CMR may be generated by merging data of the 5-5 fingerprint sensor A55 of the first central area CR1, data of the 5-1 fingerprint sensor B51 of the second extension area ER2, data of the 1-5 fingerprint sensor C15 of the third extension area ER3, and data of the 1-1 fingerprint sensor D11 of the fourth extension area ER4. The 4-4 data CM44 of the core merge region CMR may be generated by merging data of the 6-6 fingerprint sensor A66 of the first central area CR1, data of the 6-2 fingerprint sensor B62 of the second peripheral area SR2, data of the 2-6 fingerprint sensor C26 of the third peripheral area SR3, and data of the 2-2 fingerprint sensor D22 of the fourth peripheral area SR4.

The peripheral merge region SMR of the fingerprint data FPD may be generated by merging data of peripheral areas SR or extension areas of the sensing areas SSR adjacent to each other. For example, the 1-1 data SM11 of the peripheral merge region SMR may be generated by merging data of the 1-5 fingerprint sensor A15 of the first extension area ER1 and data of the 1-1 fingerprint sensor B11 of the second extension area ER2. The 2-2 data SM22 of the peripheral merge region SMR may be generated by merging data of the 2-6 fingerprint sensor A26 of the first extension area ER1 and data of the 2-2 fingerprint sensor B22 of the second extension area ER2.

As described above, the data merger 520 may merge data of the plurality of sensing areas SSR to emphasize important information and remove non-important information among the data of the sensing signals SE_REF and SE_FP. Further, the data merger 520 may generate the reference data REFD or the fingerprint data FPD using not only data of the central area CR of the sensing areas SSR but also data of the peripheral area SR and data of the extension area ER. Accordingly, the sensor driver 500 may widely use data of the central area CR, data of the peripheral area SR, and data of the extension area ER in the process of merging data of the plurality of fingerprint sensors FPS, thereby naturally merging data of the plurality of sensing areas SSR and acquiring high-quality fingerprint images from low-resolution fingerprint sensors.

Figure 23:
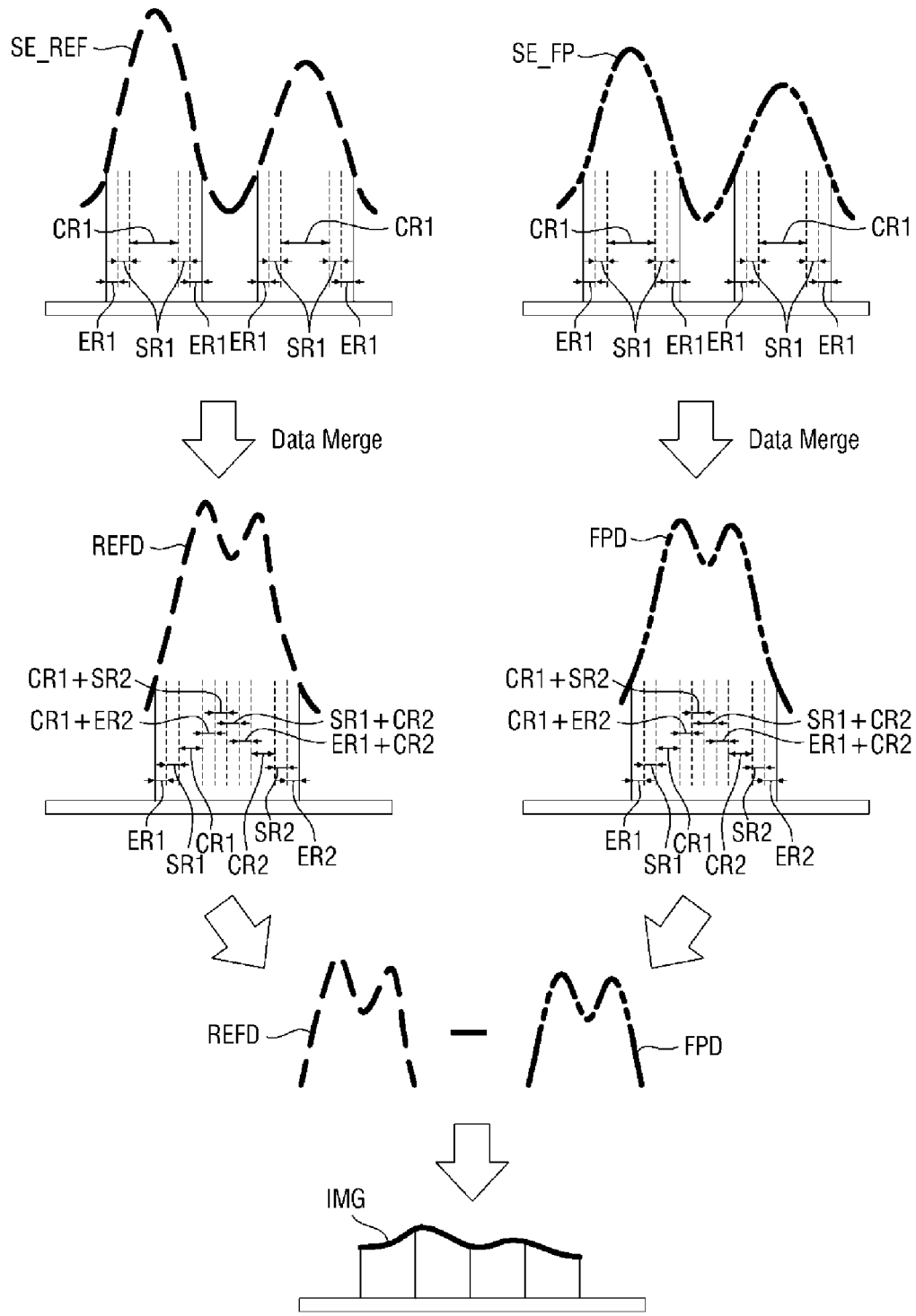
FIG. 23 is a view illustrating a process of generating a fingerprint image in a display device according to another embodiment.

FIG. 23 is a view illustrating a process of generating a fingerprint image in a display device according to another embodiment. Here, FIG. 23 shows a method of merging data of first and second sensing areas SSR1 and SSR2, but the method shown in FIG. 23 is substantially the same as the method described with reference to FIGS. 19 to 22. Therefore, the configuration shown in FIG. 23 may be used as it is in the process of merging data of four or more sensing areas SSRs. Further, the first and second sensing areas SSR1 and SSR2 shown in FIG. 23 may further include extension areas ER1 and ER2 extending from the first and second sensing areas SSR1 and SSR2 shown in FIG. 18. Therefore, the same configuration as the above-described configuration will be briefly described or omitted.

Referring to FIG. 23, the fingerprint sensing layer FPSL may include first and second sensing areas SSR1 and SSR2, and each of the first and second sensing areas SSR1 and SSR2 may include each of first and second central areas CR1 and CR2, each of first and second peripheral areas SR1 and SR2, and each of first and second extension areas ER1 and ER2.

When the reference member RM is in contact with the cover window CW, the data extractor 510 may extract data of the sensing areas SSR from the sensing signal SE_REF corresponding to the reference member RM.

The data merger 520 may merge the data of the sensing areas SSR from the sensing signal SE_REF corresponding to the reference member RM to generate reference data REFD. The data merger 520 may merge data of the peripheral area SR and extension area ER of each of the sensing areas SSR with data of the central area CR of another sensing area SSR adjacent to the corresponding sensing area SSR to generate reference data REFD.

For example, the data merger 520 may receive the sensing signal SE_REF corresponding to the reference member RM, and may merge data of the first peripheral area SR1 and extension area ER1 of the first sensing area SSR1 with data of the second central area CR2 of the second sensing area SSR2 to form merged regions SR1+CR2 and ER1+CR2. Further, the data merger 520 may merge data of the second peripheral area SR2 and second extension area ER2 of the second sensing area SSR2 with data of the first central area CR1 of the first sensing area SSR1 to form merged regions CR1+SR2 and CR1+ER2. The data merger 520 may merge data of the plurality of sensing areas SSR to generate the reference data REFD.

The memory 530 may store the reference data REFD generated using the reference member RM before a user's touch occurs. The memory 530 may supply the stored reference data REFD to the comparator 540 when the user's touch occurs.

When the user's finger F touches the cover window CW, the data extractor 510 may extract data of the sensing areas SSR from the sensing signal SE_FP corresponding to the user's fingerprint.

The data merger 520 may merge data of the sensing areas SSR from the sensing signal SE_FP corresponding to the user's fingerprint to generate fingerprint data FPD. The data merger 520 may merge data of the peripheral area SR and extension area ER of each of the sensing areas SSR with data of the central area CR of another sensing area SSR adjacent to the corresponding sensing area SSR to generate fingerprint data FPD.

For example, the data merger 520 may receive the sensing signal SE_FP corresponding to the user's fingerprint, and may merge data of the first peripheral area SR1 and first extension area ER1 of the first sensing area SSR1 with data of the second central area CR2 of the second sensing area SSR2 to form merged region SR1+CR2 and ER1+CR2. Further, the data merger 520 may merge data of the second peripheral area SR2 and second extension area ER2 of the second sensing area SSR2 with data of the first central area CR1 of the first sensing area SSR1 to form merged regions CR1+SR2 and CR1+ER2. The data merger 520 may merge data of the plurality of sensing areas SSR to generate the fingerprint data FPD.

When a user's touch occurs, the comparator 540 may receive the reference data REFD from the memory 530 and receive the fingerprint data FPD from the data merger 520. The comparator 540 may output a difference value REFD-FPD between the reference data REFD and the fingerprint data FPD and supply the difference value REFD-FPD to the image generator 550.

The image generator 550 may receive the output of the comparator 540 to generate a fingerprint image IMG. The image generator 550 may generate the fingerprint image IMG using image information (or optical information and fingerprint information) of the output of the comparator 540. For example, the image generator 550 may generate the fingerprint image IMG from the output of the comparator 540 by inversely using or calculating optical characteristics for calculating data values of the sensing signal SE_FP from an image of a reflective material (for example, a user's body).

Figure 24:
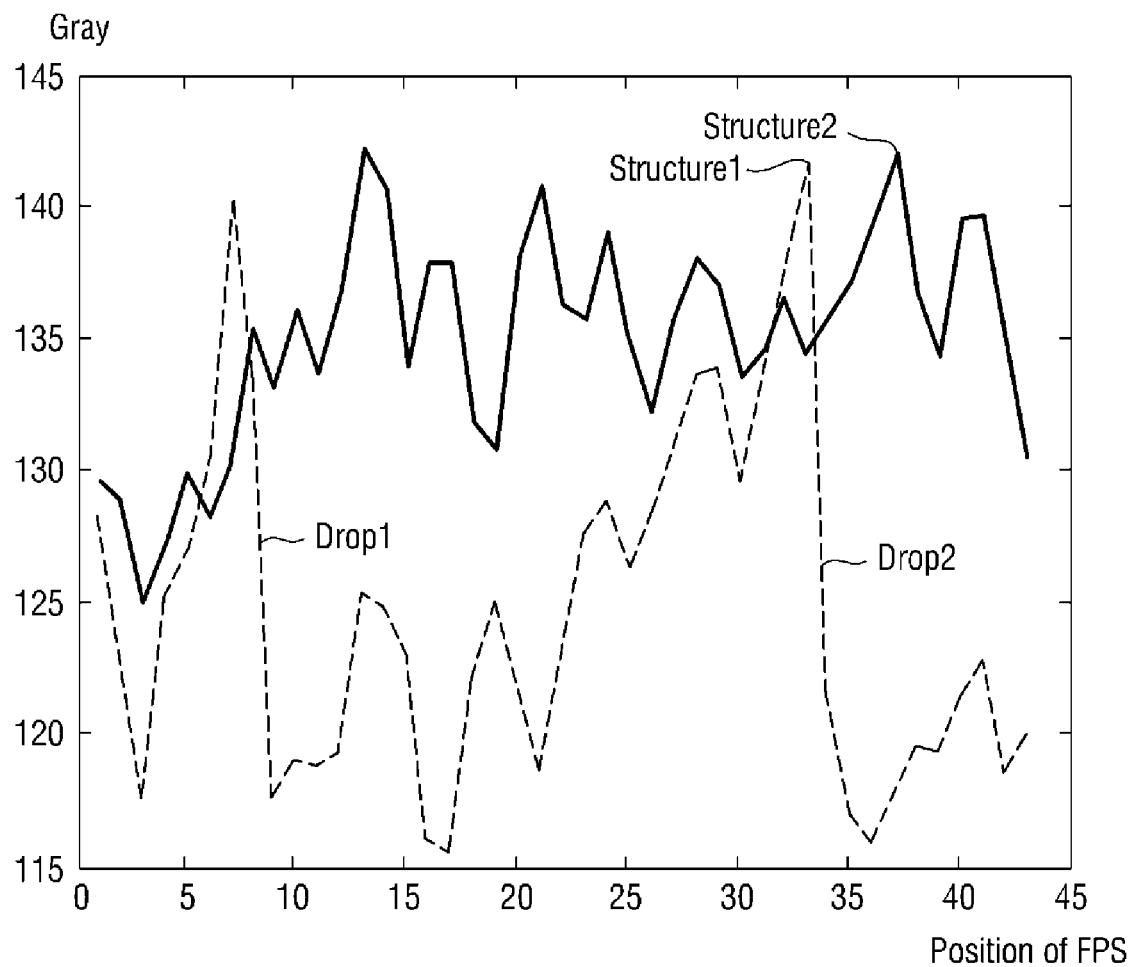
FIG. 24 is a view illustrating the quality of a fingerprint image generated from a display device according to an embodiment.

FIG. 24 is a view illustrating the quality of a fingerprint image generated from a display device according to an embodiment. The X-axis in FIG. 24 corresponds to a pixel position of a fingerprint image IMG, and the Y-axis in FIG. 24 corresponds to a gray scale of the fingerprint image IMG. Here, a first structure Structure1 corresponds to a display device generating a low-resolution fingerprint image without using reference data, a second structure Structure2 corresponds to a display device generating a low-resolution fingerprint image according to the procedures shown in FIGS. 12 to 18. The quality of the fingerprint image generated by the display device according to the present application is not limited to the results of FIG. 24, and may be changed depending on the configuration of the fingerprint sensing layer FPSL and the operation of the sensor driver 500.

The low-resolution fingerprint image generated by the display device of the first structure Structure1 may include first and second drop regions Drop1 and Drop2. Accordingly, the display device of the first structure Structure1 may have a large difference in gray values of pixels of adjacent fingerprint images. Each of the first and second drop regions Drop1 and Drop2 may generate a grid pattern on the fingerprint image, and may deteriorate the quality of the fingerprint image.

In the low-resolution fingerprint image IMG generated by the display device of the second structure Structure2, the gray value of adjacent pixels may not be changed rapidly. Therefore, the fingerprint image IMG generated by the display device of the second structure 2 does not include a quality deterioration element such as a grid pattern, and thus the display device of the second structure Structure2 may obtain a high quality fingerprint image. The display device of the second structure Structure2 can prevent the fingerprint image from being distorted by using a low-resolution fingerprint sensor and can generate a fingerprint image capable of clearly distinguishing the ridge FR and valley FV of a user's fingerprint.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
a display panel displaying an image;
a light blocking layer disposed under the display panel and comprising a plurality of holes;
a fingerprint sensing layer with sensing areas comprising a plurality of fingerprint sensors receiving reflected light passing through the plurality of holes and generating a sensing signal, wherein each of the sensing areas includes a central area with concentrated information about the user's fingerprint; and a peripheral area surrounding the central area; and
a sensor driver controlling operations of the plurality of fingerprint sensors,
wherein the sensor driver compares fingerprint data generated based on the sensing signal with prestored reference data to generate a fingerprint image,
wherein the sensor driver receives the sensing signal corresponding to the user's fingerprint, and merges data of the peripheral area of each of the sensing areas and data of the central area of another sensing area adjacent to the corresponding sensing area to generate the fingerprint data.

2. The display device of claim 1,
wherein the sensing signal corresponds to a user's fingerprint, and
the sensor driver merges data from the sensing areas comprising the plurality of fingerprint sensors corresponding to each of the plurality of holes to generate the fingerprint data.

3. The display device of claim 2,
wherein the sensor driver receives a sensing signal generated from the reflected light by a reference member, and merges the data from the sensing areas comprising the plurality of fingerprint sensors corresponding to each of the plurality of holes to generate the prestored reference data.

4. The display device of claim 3,
wherein the sensor driver further comprises a memory, and
the sensor driver generates the reference data from reflected light by the reference member before a user's touch occurs, and stores the reference data.

5. The display device of claim 4,
wherein, when the user's touch occurs, the sensor driver recognizes a user's fingerprint pattern based on a difference value between the reference data stored in the memory and the fingerprint data generated from the user's fingerprint.

6. The display device of claim 4,
wherein the sensor driver further comprises a comparator comprising a first input terminal receiving the reference data from the memory, a second input terminal receiving the fingerprint data, and an output terminal outputting a difference value between the reference data and the fingerprint data.

7. The display device of claim 3,
wherein the reference member is made of silicone or paper, and
a surface of the reference member, the surface facing the fingerprint sensing layer, is flat.

8. The display device of claim 1,
wherein the sensor driver receives the sensing signal corresponding to a reference member, and merges data of the peripheral area of each of the sensing areas and data of the central area of another sensing area adjacent to the corresponding sensing area to generate the prestored reference data.

9. The display device of claim 1,
wherein the sensing areas comprises a first sensing area and a second sensing area disposed at one side of the first sensing area, and
the sensor driver receives the sensing signal corresponding to the user's fingerprint, merges data of the peripheral area of the first sensing area and data of the central area of the second sensing area, and merges data of the peripheral area of the second sensing area and data of the central area of the first sensing area to generate the fingerprint data.

10. The display device of claim 1,
wherein the sensing areas comprises a first sensing area and a second sensing area disposed at one side of the first sensing area, and the sensor driver receives the sensing signal corresponding to a reference member, merges data of the peripheral area of the first sensing area and data of the central area of the second sensing area, and merges data of the peripheral area of the second sensing area and data of the central area of the first sensing area to generate the prestored reference data.

11. A display device, comprising:

a display panel displaying an image;

a fingerprint sensing layer with sensing areas comprising a plurality of fingerprint sensors receiving reflected light passing through a plurality of holes and generating a sensing signal, wherein each of the sensing areas includes a central area where information about the user's fingerprint is concentrated; a peripheral area surrounding the central area; and an extension area surrounding the peripheral area and comprising data generated based on the data of the central area and the data of the peripheral area; and a sensor driver controlling operations of the plurality of fingerprint sensors, wherein the sensor driver generates fingerprint data based on the sensing signal generated from reflected light by a user's fingerprint, and generates a fingerprint image based on prestored reference data and the fingerprint data, wherein the sensor driver receives the sensing signal corresponding to the user's fingerprint, and merges data of the peripheral area of each of the sensing areas and data of the central area of another sensing area adjacent to the corresponding sensing area to generate the fingerprint data.

12. The display device of claim 11, wherein the sensor driver receives the sensing signal corresponding to a reference member, and the sensor driver merges data of the peripheral area and extension area of each of the sensing areas and data of the central area of another sensing area adjacent to the corresponding sensing area to generate the prestored reference data.

13. The display device of claim 11, wherein the sensor driver comprises a first sensing area and a second sensing area disposed at one side of the first sensing area, and the sensor driver receives the sensing signal corresponding to the user's fingerprint, merges data of the peripheral area and extension area of the first sensing area and data of the central area of the second sensing area, and merges data of the peripheral area and extension area of the second sensing area and data of the central area of the first sensing area to generate the fingerprint data.

14. The display device of claim 11, wherein the sensor driver comprises a first sensing area and a second sensing area disposed at one side of the first sensing area, and the sensor driver receives the sensing signal corresponding to a reference member, merges data of the peripheral area and extension area of the first sensing area and data of the central area of the second sensing area, and merges data of the peripheral area and extension area of the second sensing area and data of the central area of the first sensing area to generate the prestored reference data.

15. The display device of claim 11, wherein the data of the extension area is generated based on an average value in differences between the data of the central area of each of the plurality of sensing areas and the data of the peripheral area thereof.

16. The display device of claim 11, wherein a width of the peripheral area is equal to a width of the extension area.

* * * * *